United States Patent
AlTammar et al.

(10) Patent No.: US 11,680,469 B2
(45) Date of Patent: Jun. 20, 2023

(54) METHOD AND SYSTEM FOR AUTONOMOUS FLOW RATE CONTROL IN HYDRAULIC STIMULATION OPERATIONS

(71) Applicants: SAUDI ARABIAN OIL COMPANY, Dhahran (SA); ARAMCO SERVICES COMPANY, Houston, TX (US)

(72) Inventors: Murtadha J. AlTammar, Dhahran (SA); Khalid Mohammed Alruwaili, Dammam (SA); Dung T. Phan, Brookshire, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 122 days.

(21) Appl. No.: 17/165,372

(22) Filed: Feb. 2, 2021

(65) Prior Publication Data
US 2022/0243568 A1 Aug. 4, 2022

(51) Int. Cl.
*E21B 43/12* (2006.01)
*E21B 43/26* (2006.01)
*F04B 49/06* (2006.01)
*G01N 11/00* (2006.01)

(52) U.S. Cl.
CPC .......... *E21B 43/12* (2013.01); *E21B 43/2607* (2020.05); *F04B 49/065* (2013.01); *G01N 11/00* (2013.01)

(58) Field of Classification Search
CPC .... E21B 43/12; E21B 43/2607; F04B 49/065; G01N 11/00
See application file for complete search history.

(56) References Cited

U.S. PATENT DOCUMENTS

| 10,900,343 B1* | 1/2021 | Buerger ................. E21B 44/02 |
| 2005/0039527 A1* | 2/2005 | Dhruva ................... E21B 49/10 |
| | | 73/152.27 |

(Continued)

FOREIGN PATENT DOCUMENTS

| EP | 3073051 A1 | 9/2016 |
| WO | 2017/044074 A1 | 3/2017 |

(Continued)

OTHER PUBLICATIONS

Elias Pirayesh et al., "A New Method To Interpret Fracturing Pressure—Application to Frac Pack", SPE Annual Technical Conference and Exhibition, New Orleans, Sep. 30-Oct. 2, 2013, pp. 508-671.*

(Continued)

*Primary Examiner* — Alexander Satanovsky
(74) *Attorney, Agent, or Firm* — Osha Bergman Watanabe & Burton LLP

(57) ABSTRACT

A method may include determining time-derivative pressure data based on pressure data regarding a pump system that is performing a hydraulic stimulation operation in a geological region. The method may further include determining a moving average value based on the time-derivative pressure data and a predetermined time window. The method may further include determining a flow rate adjustment for the pump system based on the moving average value, an update interval for adjusting flow rates, and a predetermined flow rate rule. A size of the predetermined time window may be different from the update interval. The method may further include using smoothed pressure data to determine time-derivative pressure data. The method may further include determining a flow rate adjustment for the pump system based on the time-derivative pressure data derived from the smoothed pressure data.

18 Claims, 16 Drawing Sheets

(56) References Cited

U.S. PATENT DOCUMENTS

| | | | |
|---|---|---|---|
| 2018/0363640 A1 | 12/2018 | Kajita et al. | |
| 2019/0112910 A1 | 4/2019 | Oehring et al. | |
| 2020/0056466 A1 | 2/2020 | Mazrooee et al. | |
| 2020/0256177 A1* | 8/2020 | Mazrooee | ............... E21B 47/06 |
| 2022/0018245 A1 | 1/2022 | Coenen | |
| 2022/0186605 A1* | 6/2022 | Quan | ...................... E21B 47/06 |

FOREIGN PATENT DOCUMENTS

| | | |
|---|---|---|
| WO | 2018160183 A1 | 9/2018 |
| WO | 2019125359 A1 | 6/2019 |
| WO | 2020097053 A1 | 5/2020 |
| WO | 2020145979 A1 | 7/2020 |

OTHER PUBLICATIONS

Morozov, A.D. et al., "Data-driven model for fracturing design optimization: focus on building digital database and production forecast", Journal of Petroleum Science & Engineering, Special Issue: Petroleum Data Science, Jan. 2020, pp. 1-23 (23 pages).

Ben, Yuxing et al., "Real-Time Hydraulic Fracturing Pressure Prediction with Machine Learning", SPE-199699-MS, SPE Hydraulic Fracturing Technology Conference and Exhibition, Society of Petroleum Engineers, Feb. 2020 (14 pages).

International Search Report and Written Opinion issued in corresponding International Patent Application No. PCT/JS2022/014940, dated May 20, 2022 (15 pages).

Pirayesh, Elias et al., "A New Method To Interpret Fracturing Pressure-Application to Frac Pack", Paper No. SPE-166132-PA, SPE J. 20, pp. 508-571, 2015 (10 pages).

* cited by examiner

METHOD AND SYSTEM FOR AUTONOMOUS FLOW RATE CONTROL IN HYDRAULIC STIMULATION OPERATIONS

BACKGROUND

Natural fractures present in subsurface formations are discontinuities representing a surface or zone of mechanical failure in the formation. In particular, fractures may be formed over geological time as a result of movements and deformations within the subsurface rock, and continue to form as a result of microseismic events. By using various types of fluids, natural fractures may be opened and modified to increase their permeability with respect to hydrocarbon deposits in the subsurface formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes determining, by the computer processor, time-derivative pressure data based on pressure data regarding a pump system that is performing a hydraulic stimulation operation in a geological region. The method further includes determining, by the computer processor, a moving average value based on the time-derivative pressure data and a predetermined time window. The method further includes determining, by the computer processor, a flow rate adjustment for the pump system based on the moving average value, an update interval for adjusting flow rates, and a predetermined flow rate rule. A size of the predetermined time window is different from the update interval. The method further includes transmitting, by the computer processor and based on the flow rate adjustment, a command to the pump system that changes a flow rate within the hydraulic stimulation operation.

In general, in one aspect, embodiments relate to a method that includes determining, by a computer processor, smoothed pressure data based on pressure data regarding a pump system that is performing a hydraulic stimulation operation in a geological region. The method further includes determining, by the computer processor, time-derivative pressure data based on the smoothed pressure data. The method further includes determining, by the computer processor, a flow rate adjustment for the pump system based on the smoothed pressure data, an update interval for adjusting flow rates, and a predetermined flow rate rule. The method further includes transmitting, by the computer processor and based on the flow rate adjustment, a command to the pump system that changes a flow rate within the hydraulic stimulation operation.

In general, in one aspect, embodiments relate to a method that includes obtaining, by a computer processor, first observation data regarding a hydraulic stimulation environment. The first observation data include pressure data and flow rate data regarding a hydraulic stimulation operation. The method further includes determining, by the computer processor and based on an agent policy and the first observation data, an action for a pump agent. The pump agent corresponds to a pump system coupled to a wellbore, a fluid control system, and a proppant system. The action corresponds to a flow rate adjustment for the pump system. The method further includes obtaining, by the computer processor, second observation data regarding the hydraulic stimulation environment in response to the pump agent performing the action. The method further includes determining, by the computer processor, a reward value for the pump agent based on the second observation data and a reward function. The method further includes updating, by the computer processor, the agent policy based on the reward value to produce an updated policy. The updated policy determines an action for the pump agent.

In general, in one aspect, embodiments relate to a system that includes a pump system that includes a displacement pump. The system further includes various sensors coupled to the pump system. The sensors determine pressure data regarding a hydraulic stimulation operation. The system further includes a hydraulic stimulation manager including a computer processor. The hydraulic stimulation manager is coupled to the pump system. The hydraulic stimulation manager determines time-derivative pressure data based on pressure data regarding a pump system that is performing a hydraulic stimulation operation in a geological region. The hydraulic stimulation manager determines a moving average value based on the time-derivative pressure data and a predetermined time window. The hydraulic stimulation manager determines a flow rate adjustment for the pump system based on the moving average value, an update interval for adjusting flow rates, and a predetermined flow rate rule. A size of the predetermined time window is different from the update interval. The hydraulic stimulation manager transmitting, based on the flow rate adjustment, a command to the pump system that changes a flow rate within the hydraulic stimulation operation.

In general, in one aspect, embodiments relate to a system that includes a pump system that includes a displacement pump. The system further includes various sensors coupled to the pump system. The sensors determine pressure data regarding a hydraulic stimulation operation. The system further includes a hydraulic stimulation manager including a computer processor. The hydraulic stimulation manager is coupled to the pump system. The hydraulic stimulation manager determines, by the computer processor, smoothed pressure data based on the pressure data regarding the pump system. The hydraulic stimulation manager further determines time-derivative pressure data based on the smoothed pressure data. The hydraulic stimulation manager determines a flow rate adjustment for the pump system based on the smoothed pressure data, an update interval for adjusting flow rates, and a predetermined flow rate rule. The hydraulic stimulation manager further transmits, based on the flow rate adjustment, a command to the pump system that changes a flow rate within the hydraulic stimulation operation.

In general, in one aspect, embodiments relate to a system that includes various pump agents that are coupled to various displacement pumps. The system further includes various sensors coupled to the pump agents. The pump agents correspond to a pump system, a fluid control system, and/or a proppant system. The sensors determine pressure data regarding a hydraulic stimulation operation. The system further includes a hydraulic stimulation manager including a computer processor. The hydraulic stimulation manager is coupled to the pump agents. The hydraulic stimulation manager obtains first observation data regarding a hydraulic stimulation environment. The first observation data include pressure data and flow rate data regarding the hydraulic stimulation operation. The hydraulic stimulation manager further determines, based on one or more agent policies of the pump agents and the first observation data, an action for at least one of the pump agents. In some embodiments, the action corresponds to a flow rate adjustment for the pump system. The hydraulic stimulation manager further obtains second observation data regarding the hydraulic stimulation environment in response to a performance of the action or actions. The hydraulic stimulation manager determines a reward value for a respective pump agent based on the second observation data and a reward function. The hydraulic stimulation manager updates one or more agent policies of the pump agents based on the reward value to produce one or more updated policies. The updated policies determine one or more actions for one or more of the pump agents.

In some embodiments, pressure data is obtained from various downhole sensors that include a first downhole sensor coupled to a casing with a wellbore and a second downhole sensor coupled to a frac plug/ball within the wellbore, and the downhole sensors stream the pressure data in real-time over a well network to a hydraulic stimulation manager disposed at a surface of a well site.

In some embodiments, one or more predetermined flow rate rules are determined by a reinforcement learning system including an action selector engine and a training system. The one or more predetermined flow rate rules may correspond to one or more agent policies that are determined by a reinforcement learning algorithm, and the one or more predetermined flow rate rules may define a size of the dynamic time window, a size of the flow rate adjustment increment, and various conditions for increasing, decreasing, and maintaining a flow rate of the pump system.

In some embodiments, wherein the one or more predetermined flow rate rules include a first rule, a second rule, and a third rule. The first rule may correspond to no flow rate adjustment when the moving average value is positive. The second rule may correspond to a positive flow rate increment when the moving average value is negative or equal to zero. The third rule may correspond to a negative flow rate increment when a pressure value at a current time step is equal to or greater than the predetermined maximum pressure value.

In some embodiments, flow rate data are obtained regarding the pump system from a flow rate sensor. One or more flow rate rules may be based on the flow rate data from a previous time step.

In some embodiments, various recommended flow rate adjustments for the pump system are determined based on the moving average value and one or more predetermined flow rate rules; presenting, within a graphical user interface in a user device, the recommended flow rate adjustments. In response to a selection of a recommended flow rate adjustment among the recommended flow rate adjustments, a command may be transmitted to the pump system to implement the recommended flow rate adjustment.

In some embodiments, a pressure curve is determined from pressure data. A smoothing operation may be performed on the pressure curve using a Discrete Fourier Transform with a low pass filter, or alternatively using a median filter or any other smoothing methods, to produce a smoothed pressure curve. Time-derivative pressure data may be determined using the smoothed pressure curve.

In some embodiments, a pump system sends a hydraulic fracturing fluid into a wellbore at a predetermined flow rate during the hydraulic stimulation operation. The hydraulic fracturing fluid may include at least one propping agent and produce a fracture network laterally from the wellbore.

In some embodiments, a training system obtains training data regarding a pump agent. The training system may determine, based on a loss function, a mismatch between the training data and observation data regarding one or more hydraulic stimulation operations. Various policy parameters of an updated policy may be adjusted based on the mismatch.

In some embodiments, a replay buffer obtains various pump agent trajectories regarding various pump agents. A reward function may be updated based on the pump agent trajectories, where the reward function is associated with at least one pump agent. Various agent policies associated with the pump agents may be updated using the updated reward function.

In some embodiments, the agent policy is updated using training data that corresponds to training pressure data and training flow rate data. In some embodiments, observation data include acoustic sensor data that is obtained from a distributed acoustic sensing (DAS) system that is disposed in the wellbore.

In some embodiments, a system determines various recommended flow rate adjustments for a pump system based on time-derivative data based on smoothed pressure data or moving average values and the one or more predetermined flow rate rules. The system may present, within a graphical user interface in a user device, the recommended flow rate adjustments. The system may transmit, in response to a selection of one of the recommended flow rate adjustment, a command to the pump system to implement the selection of the recommended flow rate adjustment.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
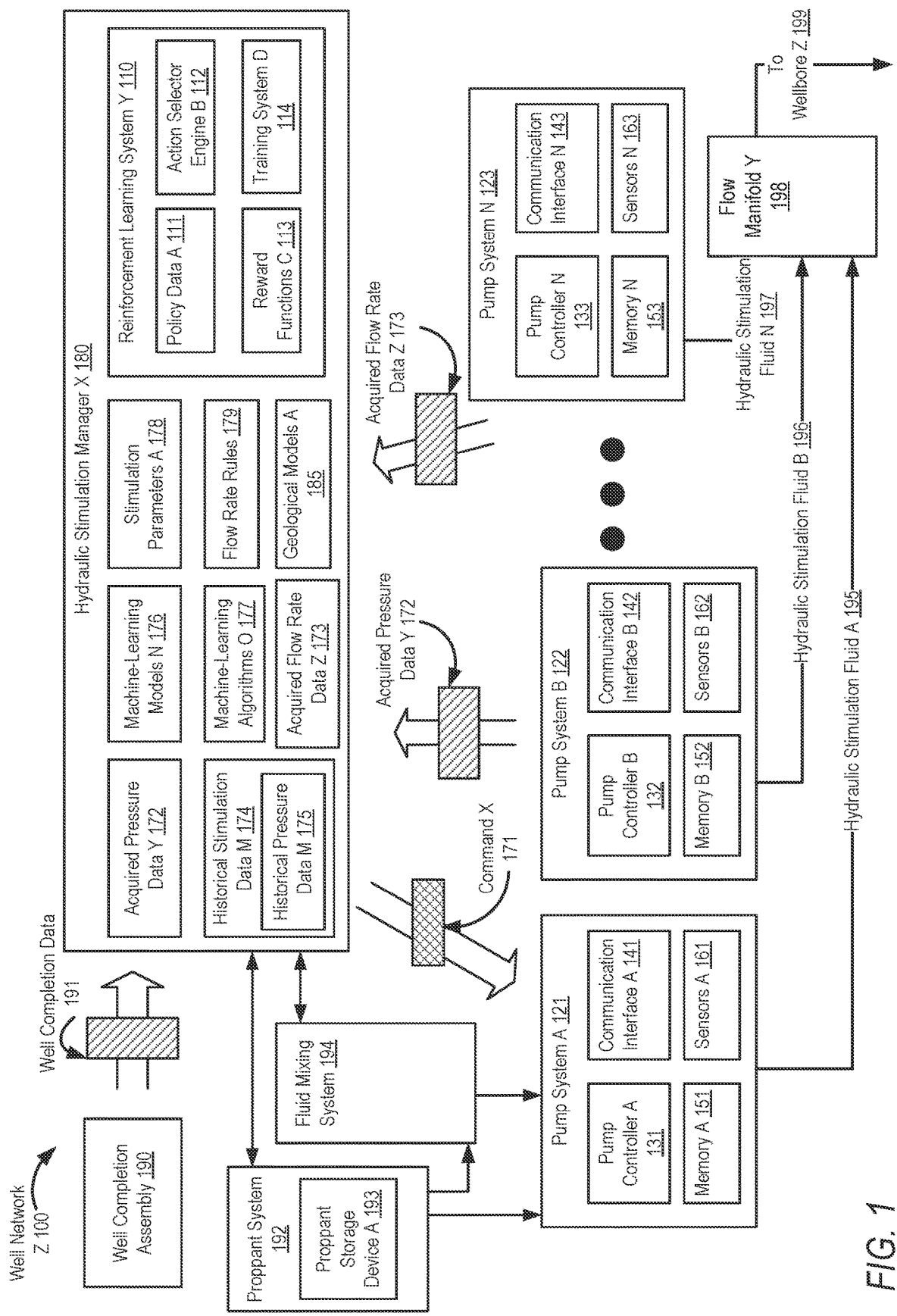
FIGS. 1, 2, and 3 show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for autonomous flow rate control to manage stage-to-stage execution of a hydraulic stimulation operation. In some embodiments, for example, one or more flow rate adjustments may be determined for a pump system based on predetermined flow rate rules and moving average values based on time-derivative pressure data. More specifically, a flow rate rule may determine situations during a hydraulic stimulation operation where a flow rate is increased, decreased, or maintained using various stimulation parameter inputs, such as rate increment values, update intervals, target flow rates, moving average values, etc. As such, a moving average value may be determined by a time window that may be specified by a user or automatically determined by a hydraulic stimulation manager, e.g., based on a machine-learning algorithm. The size of the time window may control how responsive flow rate adjustments are to changes in time-derivative pressure data and transient noise within pressure data.

Furthermore, flow rate rules may be determined by various reinforcement learning techniques. For example, a pump agent may operate on an agent policy that corresponds to one or more flow rate rules. By interacting with a hydraulic stimulation environment, different actions by the pump agent may be rewarded using a reward function. Accordingly, an agent policy or flow rate rule may be optimized based on observations of the pump agent's interaction with the hydraulic stimulation environment. In some embodiments, an agent's policy or reward function may be optimized through a machine-learning training process. For example, a hydraulic stimulation manager may include a reinforcement learning system for implementing a reinforcement learning algorithm as well as a training process for components (e.g., pump systems) within a well network.

Accordingly, some embodiments may use flow rate rules to increase distribution uniformity of fluid and proppant among different perforation clusters within a particular hydraulic fracturing stage. As such, autonomous pump rate controls may provide one or more of the following: (i) a more even distribution of proppant and fluid among various perforation clusters; (ii) consistent performances between stimulation stages within a hydraulic stimulation operation and between hydraulic stimulation operations, e.g., at different wells; (iii) a lower average treating pressure for initiating and propagating hydraulic fractures; and (iv) a reduction or elimination of screenouts and inter-well communication from hydraulic stimulation operations. In contrast to manual rate control by human operators, autonomous rate control may prevent large inconsistencies in stage-to-stage execution that cause significant non-uniform distributions of fluid and proppant among different perforation clusters and ultimately poor hydraulic fracturing performance.

Turning to FIG. 1, FIG. 1 shows a schematic diagram in accordance with one or more embodiments. As shown in FIG. 1, a well network (e.g., well network Z (100)) may include a well completion assembly (e.g., well completion assembly (190)), one or more proppant systems (e.g., proppant system (192)), one or more fluid mixing systems (e.g., fluid mixing system (194)), and one or more pump systems (e.g., pump system A (121), pump system B (122), pump system N (123)). For example, a well completion assembly may include one or more inflatable packers as well as a work string or casing string that extends within a wellbore. A casing string may include steel casing or pipe that may be divided into surface casing, intermediate casing, and/or production casing. Packers may include inflatable packers that seal an annulus defined between well completion equipment and an inner wall of the wellbore in order to divide a formation into multiple wellbore intervals. These wellbore intervals may be separately or simultaneously stimulated during a hydraulic stimulation operation. Likewise, the well completion assembly may include perforation equipment (e.g., perforating guns) for producing holes at different wellbore intervals. After a flow manifold (e.g., flow manifold Y (198)) receives hydraulic stimulation fluid, for example, the hydraulic stimulation fluid may be sent down a wellbore (e.g., to wellbore Z (199)), e.g., to a particular interval for a hydraulic stimulation operation. During a hydraulic stimulation operation, stimulation fluid may be sent to different wellbore intervals to initiate and propagate fractures, e.g., in an open-hole completion operation or a cased-hole completion operations (which are described in more detail below in regard to FIG. 3).

With respect to proppant systems, a proppant system may include transfer devices, such as chutes and conveyor belts, for transferring a propping agent (also called simply "proppant") to a fluid mixing system. Likewise, a proppant system may include one or more proppant storage devices (e.g., proppant storage device A (193)), such as a silo, and a housing. In particular, a silo may use fill ports for acquiring propping agents, which may be subsequently transferred to a fluid mixing system using drain valves and/or outlet ports. The proppant system may then dispense the propping agent to the fluid mixing system for producing a stimulation fluid. With respect to fluid mixing systems, a fluid mixing system may include hardware and/or software for combining proppant with one or more liquid additives and other fluids (e.g., water). More specifically, a fluid mixing system may include a blender and/or various liquid storage devices that are added to one or more propping agents to produce a particular stimulation fluid. As such, a fluid mixing system may produce and/or dispense a hydraulic stimulation fluid with various predetermined fluid properties (e.g., with a particular viscosity, density, or one or more rheological properties).

In some embodiments, for example, a hydraulic stimulation fluid may be a fracturing fluid that is injected into an open fracture connected to a wellbore. This injection may produce and/or modify a fracture network in the subsurface. After a hydraulic fracturing operation completes a desired fracture network, the liquid portion of the fracturing fluid may be removed from the wellbore. For more information on hydraulic stimulation fluids and proppants, see FIG. 2 and the accompanying description below.

With respect to pump systems, a pump system may include hardware and software with functionality for supplying hydraulic stimulation fluid to a wellbore at one or more predetermined pressures and/or at one or more predetermined flow rates. For example, a pump system may include one or more displacement pumps that inject the hydraulic stimulation fluid into a wellbore. Likewise, a pump system may include a pump controller that includes hardware and/or software for adjusting local flow rate and pump pressures, e.g., in response to a command from a hydraulic stimulation manager. For example, a pump system may include one or more communication interfaces (e.g., communication interface A (141), communication interface B (142), communication interface N (143)) and/or memory (e.g., memory A (151), memory B (152), memory N (153)) for transmitting and/or obtaining data over a well network. A pump system may also obtain and/or store sensor data from one or more sensors (e.g., sensors A (161), sensors B (162), sensors N (163)) coupled to a wellbore regarding one or more pump operations. For example, pressure data regarding a hydraulic stimulation operation may be acquired by a pump system from wellhead sensors or downhole sensors disposed in a wellbore. While a pump system may correspond to a single pump, in some embodiments, a pump system may correspond to multiple pumps.

Figure 2:
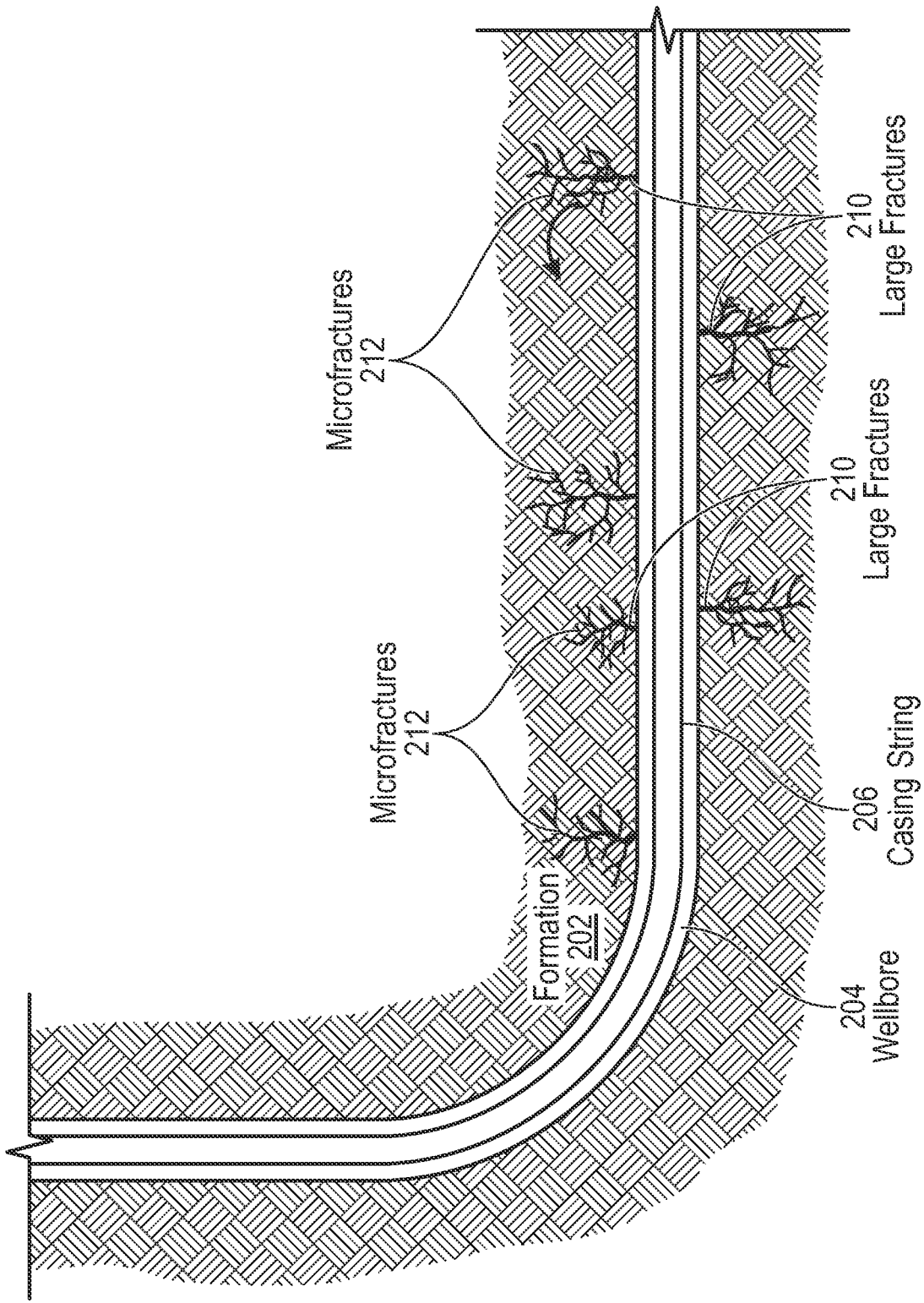

Turning to FIG. 2, FIG. 2 shows a schematic diagram in accordance with one or more embodiments. As shown in FIG. 2, FIG. 2 illustrates a hydraulic stimulation operation that forms additional microfractures (212) within a formation (202). More specifically, a wellbore (204) may be located within formation (202), where a casing string (206) is positioned within the wellbore (204). Following a hydraulic fracturing process, for example, large fractures (210) may exist within the formation (202) and extend outward from the wellbore (204). In particular, hydrocarbon reserves may be trapped within certain low permeability formations, such as sand, carbonate, and/or shale formations. Thus, stimulation treatments may enhance well productivity at one or more wells, where one type of stimulation treatment is hydraulic fracturing. In some embodiments, for example, hydraulic fracturing includes injecting high viscosity fluids into a wellbore at a sufficiently high injection rate so that enough pressure is produced within the wellbore to split the formation. As such, a stimulation operation may be determined that achieves a desired height and/or length of one or more induced fractures.

Keeping with FIG. 2, various stimulation procedures may be employed that use one or more techniques to ensure that an induced fracture becomes conductive after injection ceases. For example, during acid fracturing of carbonate formations, acid based fluids may be injected into the formation to create an etched fracture and conductive channels. These conductive channels may be left open upon closure of the induced fracture. With sand or shale formations, a proppant may be included with the hydraulic fracturing fluid such that the induced fracture remains open during or following a stimulation treatment. Likewise, in carbonate formations, a stimulation treatment may include both acid fracturing fluids and proppants. Accordingly, heat produced within a formation, acid, or aqueous water transmitted into the formation may all play a role in producing reactions causing one or more microfractures in a formation.

Keeping with hydraulic fracturing, a hydraulic fracturing fluid may be pumped through a casing string (206) and into a targeted formation using various perforations (i.e., open holes) in the casing string (206). By injecting the hydraulic fracturing fluid at pressures high enough to cause the rock within the targeted formation to fracture, the hydraulic fracturing operation may "break down" the formation. As high-pressure fluid injection continues, a fracture may continue to propagate into a fracture network. This high pressure for injecting the hydraulic fracturing fluid may be referred to as the "propagation pressure" or "extension pressure." As an induced fracture continues to grow, a proppant, such as sand, may be added to the fracturing fluid. Once a desired fracture network is formed, the fluid flow may be reversed and the liquid portion of the fracturing fluid is removed. The proppant is intentionally left behind to prevent the fractures from closing onto themselves due to the weight and stresses within the formation. Accordingly, the proppant may "prop" or support the induced fractures to remain open, by remaining sufficiently permeable for hydrocarbon fluids to flow through the induced fracture. Thus, a proppant may form a packed bed of particles with interstitial void space connectivity within a formation. Accordingly, a higher permeability fracture may result from the hydraulic fracturing operation.

In some embodiments, for example, a hydraulic fracturing fluid with an activator is injected into the formation (202), where the fluid migrates within the large fractures (210). Upon a reaction caused by the activator, the injection fluid may produce one or more gases and heat, thereby causing the microfractures (212) to be created within the formation (202). Thus, a stimulation treatment may provide pathways for the hydrocarbon deposits trapped within the formation (202) to migrate and be recovered by a production well.

Furthermore, fracture monitoring may be important to understanding and optimizing hydraulic fracturing treatments. For example, a hydraulic stimulation manager may perform diagnostics that determine various stimulation effects such as fracture geometry, proppant placement in one or more fractures, and/or fracture conductivity. This fracture monitoring may be performed using a distributed acoustic sensing (DAS) system implemented within a wellbore. In some embodiments, a DAS system includes various fiber-optic sensors (e.g., distributed over a single mode optical fiber several kilometers in length). As such, backscattered light may be measured and further analyzed using signal processing techniques to enable a DAS system to segregate an optical fiber into an array of individual acoustic receivers. More specifically, various pulses of light may be transmitted along the optical fiber, where characteristics of the backscattered light may change due to acoustic vibrations disturbing the casing of the optical fiber. Through DAS processing, the location of these disturbances may be identified.

Keeping with DAS systems, pumping operations may produce various acoustic signals along a wellbore and the adjacent fractures, where the acoustic sensing data depends upon geometrical and physical attributes of the propagating fractures. Accordingly, a quantitative DAS inversion may determine various fracture properties in hydraulic fracture monitoring. For example, a wellbore may be profiled in real time by removing DAS pump noise data and matching acquired data to a forward model regarding pulse propagation in the wellbore and adjacent fractures. Thus, DAS inversion may identify various hydraulic stimulation features such as tubing expansion, fluid-to-fluid interfaces, an adjacent hydraulic fracture, presence of a porous reservoir, and/or an annular compartment. During initial phases of a hydraulic stimulation operation, DAS inversion may determine location information of wireline logging equipment within a wellbore. For example, DAS techniques may verify whether perforating guns and packer-setting devices are disposed at desired depths in the wellbore. In some embodiments, DAS inversion is performed using additional data from distributed temperature sensors (DTS) and/or microseismic monitoring techniques.

In certain unconventional formations, for example, an important element that determines whether it is economically viable to develop a reservoir is the presence of one or more sweet spots in the reservoir. A sweet spot may be generally defined herein as the area within a reservoir that represents the best production or potential for production. In a particular geological region, the sweet spot may be determined based on a lack of ductility, a destruction of internal cohesion, an ability for a rock to deform and fail with a low degree of inelastic behavior, and a rock's capability for self-sustaining fracturing. In other words, hydraulic stimulation operations may be applied to formations that easily fracture to produce more microfractures with little plastic deformation under compression.

Figure 3:
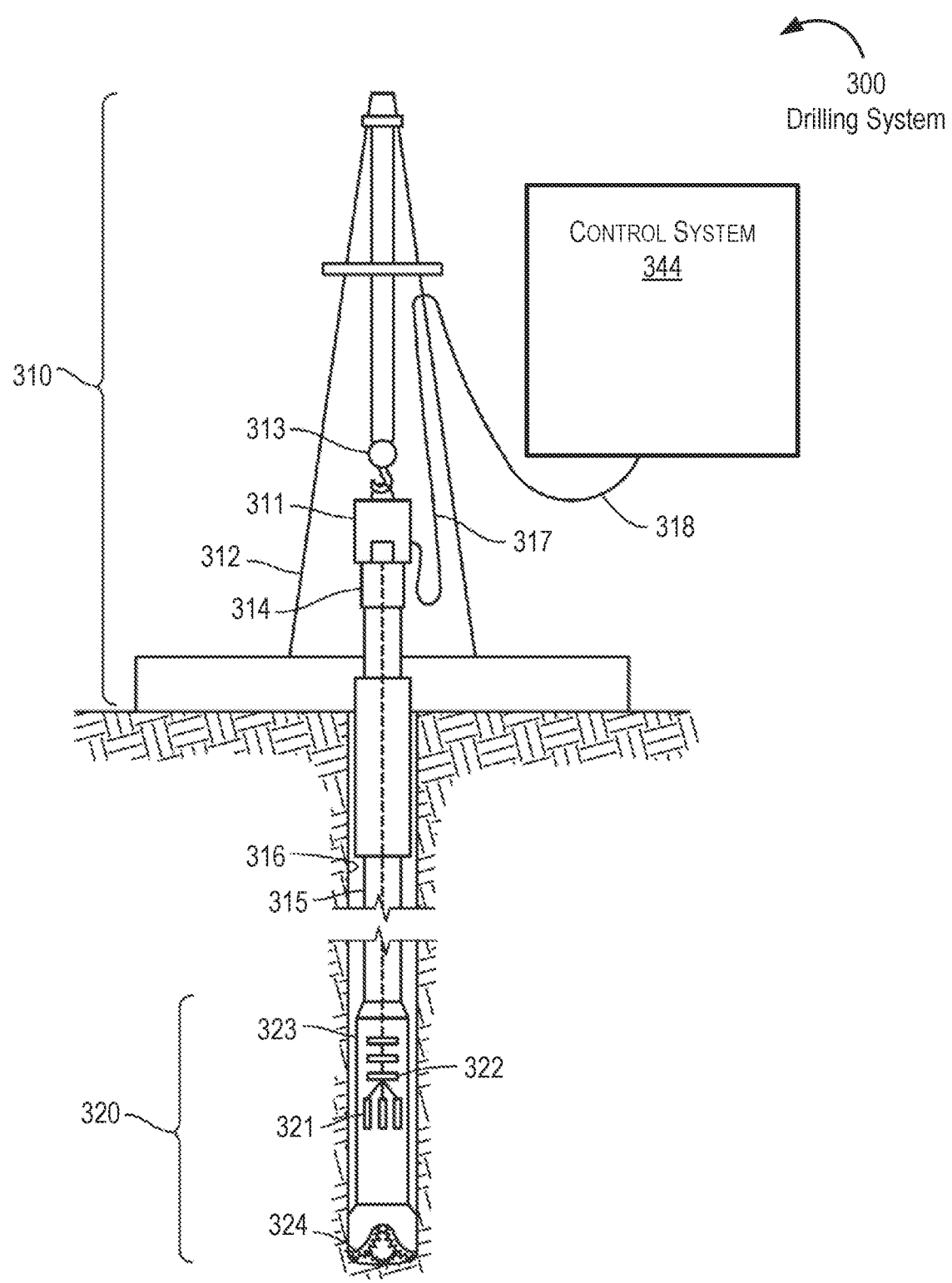

Turning to FIG. 3, FIG. 3 illustrates a system in accordance with one or more embodiments. As shown in FIG. 3, a drilling system (300) may include a top drive drill rig (310) arranged around the setup of a drill bit logging tool (320). A top drive drill rig (310) may include a top drive (311) that may be suspended in a derrick (312) by a traveling block (313). In the center of the top drive (311), a drive shaft (314) may be coupled to a top pipe of a drill string (315), for example, by threads. The top drive (311) may rotate the drive shaft (314), so that the drill string (315) and a drill bit logging tool (320) cut the rock at the bottom of a wellbore (316). A power cable (317) supplying electric power to the top drive (311) may be protected inside one or more service loops (318) coupled to a control system (344). As such, drilling mud may be pumped into the wellbore (316) through a mud line, the drive shaft (314), and/or the drill string (315).

The control system (344) may include one or more programmable logic controllers (PLCs) that include hardware and/or software with functionality to control one or more processes performed by the drilling system (300), a hydraulic stimulation operation, and/or a well completion assembly. Specifically, a programmable logic controller may control valve states, fluid levels, pipe pressures, warning alarms, and/or pressure releases throughout a well network, such as one connected to a drilling rig. In particular, a programmable logic controller may be a ruggedized computer system with functionality to withstand vibrations, extreme temperatures, wet conditions, and/or dusty conditions, for example, around a wellbore. Without loss of generality, the term "control system" may refer to an operation control system that is used to operate and control the equipment, a data acquisition and monitoring system that is used to acquire equipment data and to monitor the operation of a drilling process, a hydraulic stimulation process, or a well completion process. A control system may also include interpretation software system that is used to analyze and understand drilling events, well completion events, and hydraulic stimulation events and their respective progress.

When completing a well, casing (e.g., casing string (206)) may be inserted into the wellbore (316). The sides of the wellbore (316) may require support, and thus the casing may be used for supporting the sides of the wellbore (316). As such, a space between the casing and the untreated sides of the wellbore (316) may be cemented to hold the casing in place. The cement may be forced through a lower end of the casing and into an annulus between the casing and a wall of the wellbore (316). More specifically, a cementing plug may be used for pushing the cement from the casing. For example, the cementing plug may be a rubber plug used to separate cement slurry from other fluids, reducing contamination and maintaining predictable slurry performance. This well operation may include pumping cement slurry into the wellbore (316) to displace existing drilling fluid and fill in this space between the casing and the untreated sides of the wellbore (316). Cement slurry may include a mixture of various additives and cement. After the cement slurry is left to harden, cement may seal the wellbore (316) from non-hydrocarbons that attempt to enter the wellstream. In some embodiments, the cement slurry is forced through a lower end of the casing and into an annulus between the casing and a wall of the wellbore (316). More specifically, a cementing plug may be used for pushing the cement slurry from the casing. For example, the cementing plug may be a rubber plug used to separate cement slurry from other fluids, reducing contamination and maintaining predictable slurry performance. A displacement fluid, such as water, or an appropriately weighted drilling fluid, may be pumped into the casing above the cementing plug. This displacement fluid may be pressurized fluid that serves to urge the cementing plug downward through the casing to extrude the cement from the casing outlet and back up into the annulus.

Well completion operations may include casing operations, cementing operations, perforating the well, gravel packing, directional drilling, hydraulic stimulation of a reservoir region, and/or installing a production tree or wellhead assembly at the wellbore (316). Likewise, well operations may include open-hole completions or cased-hole completions. In open-hole completions, an uncemented casing may use one or more inflatable packers (or other packer types) to separate different frac stages or compartments. Within a given frac stage or compartment, the uncemented casing may have multiple frac sleeves or ports, where injected fluid may exit the casing and communicate with the formation. In cased-hole completions (i.e., plug'n perf completions), a cemented casing and a plug may be set to isolate a previously fractured stage, followed by creating multiple perforation clusters for the current frac stage (see, e.g., FIG. 5). Likewise, an open-hole completion may refer to a well that is drilled to the top of the hydrocarbon reservoir. Thus, the well is cased at the top of the reservoir, and left open at the bottom of a wellbore. In contrast, cased-hole completions may include running casing into a reservoir region.

Some embodiments may include perforation operations. More specifically, a perforation operation may include perforating casing and cement at different locations in the wellbore (316) to enable hydrocarbons to enter a wellstream from the resulting holes. For example, some perforation operations include using a perforation gun at different production zones to produce holed sections through the casing, cement, and sides of the wellbore (316). Hydrocarbons may then enter the wellstream through these holed sections. In some embodiments, perforation operations are performed using discharging jets or shaped explosive charges to penetrate the casing around the wellbore (316).

As further shown in FIG. 3, sensors (321) may be included in a sensor assembly (323), which is positioned in the wellbore (316), e.g., adjacent to a drill bit (324) and coupled to the drill string (315). Sensors (321) may also be coupled to a processor assembly (323) that includes a processor, memory, and an analog-to-digital converter (322) for processing sensor measurements. For example, the sensors (321) may include acoustic sensors, such as accelerometers, measurement microphones, contact microphones, and hydrophones. Likewise, the sensors (321) may include other types of sensors, such as transmitters and receivers to measure resistivity, gamma ray detectors, etc. The sensors (321) may include hardware and/or software for generating different types of well logs (such as acoustic logs or density logs) that may provide well log data about a wellbore, including porosity of wellbore sections, gas saturation, bed boundaries in a geologic formation, fractures in the wellbore or completion cement, and many other pieces of information about a formation. If such well log data are acquired during drilling operations (e.g., logging-while-drilling or measurement-while-drilling), then the information may be used to make adjustments to drilling parameters in real-time. Such adjustments may include rate of penetration (ROP), a bottom-hole circulating pressure, one or more drilling directions, altering mud weight, the amount of weight-on-bit, and many others drilling parameters.

Returning to FIG. 1, in some embodiments, a well network includes a hydraulic stimulation manager (e.g., hydraulic stimulation manager X (180)) that includes hardware and/or software for managing one or more hydraulic stimulation operations. For example, a hydraulic stimulation manager may be a controller that transmits commands (e.g., command X (171)) to one or more components within a well network (e.g., proppant system (192), fluid mixing system (194), pump system A (121), pump system B (122), pump system N (123)). In particular, a command may be a control signal that includes functionality to initiate and/or terminate one or more operations by a well network. Likewise, a command may also adjust one or more parameters regarding a proppant system, a fluid mixing system, and/or a pump system, e.g., with respect to hydraulic stimulation fluid.

Furthermore, a hydraulic stimulation manager may manage production and/or distribution of hydraulic stimulation fluids (e.g., hydraulic stimulation fluid A (195), hydraulic stimulation fluid B (196), hydraulic stimulation fluid N (197)) based on various stimulation parameters (e.g., stimulation parameters A (178)). For example, stimulation parameters may include different types and/or properties of hydraulic stimulation fluids as well as various flow parameters, such as target flow rate, rate increments for flow rate adjustments, maximum allowable pressures, starting time for a particular stimulation stage, etc.

In some embodiments, a hydraulic stimulation manager includes functionality for using collected data to adjust one or more flow rates and/or one or more pressures within a hydraulic stimulation operation. For example, a hydraulic stimulation manager may acquire pressure data (e.g., acquired pressure data Y (172) from wellhead pressure sensors, downhole pressure sensors throughout a wellbore, and local sensors coupled to one or more pumps in a pump system. Likewise, a hydraulic stimulation manager may acquire flow rate data (e.g., acquired flow rate data Z (173)) from a high pressure flowmeter based on Coriolis mass flow technology, positive displacement sensors, turbines, ultrasonic sensors, and/or volumetric measurements. In hydraulic stimulation operations, for example, a pumping rate of an injection fluid may be ramped up from zero to a predetermined target flow rate. Other types of data may also be collected, such as well completion data (e.g., well completion (191)), well log data, seismic data, and/or geological data that may be used in determining stimulation parameters for a hydraulic stimulation operation.

In some embodiments, for example, the hydraulic stimulation manager uses one or more flow rate rules (e.g., flow rate rules (179)) to implement automated flow rate controls. For example, specific flow rate rules may determine flow rate adjustments during a hydraulic stimulation operation. For illustration, a flow rate rule may specify a particular increment that a flow rate is increased or decreased based on various parameter values, such as pressure values, time-derivative pressure values, moving average values, target flow rates, current flow rate values, etc. In particular, a flow rate rule may be a user-defined rule, e.g., as specified by a user-selection within a graphical user interface provided by a hydraulic stimulation manager. In some embodiments, a hydraulic stimulation manager, a proppant system, and/or a fluid control system includes one or more components of a computer system similar to computer system (1102) described below in FIG. 11 and the accompanying description.

In some embodiments, a flow rate rule is determined using one or more machine-learning models (e.g., machine-learning models N (176)) and one or more machine-learning algorithms (e.g., machine-learning algorithms O (177)). For example, a hydraulic stimulation manager may store and/or analyze pressure data (e.g., acquired pressure data Y (172), historical pressure data M (175)), flow rate data (e.g., acquired flow rate data Z (173)), geological data (e.g., geological models A (185)), well log data, seismic data, and other sensing data (e.g., DAS data) to generate and/or update one or more machine-learning models. Thus, different types of machine-learning models may be trained, such as convolutional neural networks, deep neural networks, recurrent neural networks, support vector machines, decision trees, inductive learning models, deductive learning models, supervised learning models, unsupervised learning models, reinforcement learning models, etc. In some embodiments, two or more different types of machine-learning models are integrated into a single machine-learning architecture, e.g., a machine-learning model may include a reinforcement learning model and neural networks. In some embodiments, the hydraulic stimulation manager may generate augmented or synthetic data to produce a large amount of interpreted data for training a particular model.

With respect to neural networks, for example, a neural network may include one or more hidden layers, where a hidden layer includes one or more neurons. A neuron may be a modeling node or object that is loosely patterned on a neuron of the human brain. In particular, a neuron may combine data inputs with a set of coefficients, i.e., a set of network weights and biases for adjusting the data inputs. These network weights and biases may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

Turning to reinforcement learning, the hydraulic stimulation manager may perform one or more reinforcement learning algorithms using a reinforcement learning system (e.g., reinforcement learning system Y (110)). In particular, a reinforcement learning algorithm may be a type of method that autonomously learns agent policies through multiple iterations of trials and evaluations based on observation data. The objective of a reinforcement learning algorithm may be to learn an agent policy $\pi$ that maps the state of an environment to an action so as to maximize an expected reward $J(\pi)$. A value reward may describe one or more qualities of particular state, agent action, and/or trajectory at particular time within an operation, such as a hydraulic stimulation operation. As such, a reinforcement learning system may include hardware and/or software with functionality for implementing one or more reinforcement learning algorithms. For example, a reinforcement learning system may include an action selector engine (e.g., action select engine B (112)) to determine commands and/or pump actions based on policy data (e.g., policy data A (111)) and one or more reward functions (e.g., reward functions C (113)). More specifically, a reinforcement learning algorithm may train a policy to make a sequence of decisions based on the observed states of the environment to maximize the cumulative reward determined by a reward function. For example, a reinforcement learning algorithm may employ a trial-and-error procedure to determine one or more agent policies based on various agents interaction with a complex environment. As such, a reinforcement learning algorithm may include a reward function that teaches a particular action selection engine to follow certain rules (e.g., flow rate rules (179)), while still allowing the reinforcement learning model to retain information learned from pressure data, flow rate data, acoustic sensing data, and/or geological data.

In some embodiments, one or more components in a reinforcement learning system are trained using a training system (e.g., training system D (114)). For example, an agent policy and/or a reward function may be updated through a training process that is performed by a machine-learning algorithm. In some embodiments, historical data (e.g., historical stimulation data M (174)), augmented data, and/or synthetic data may provide a supervised signal for training an action selector engine, such as through an imitation learning algorithm. In another embodiment, an interactive expert may provide data for adjusting agent policies and/or reward functions. For more information on reinforcement learning models and algorithms, see FIGS. 9 and 10 and the accompanying description below.

While FIGS. 1, 2, and 3 show various configurations of components, other configurations may be used without departing from the scope of the disclosure. For example, various components in FIGS. 1, 2, and 3 may be combined to create a single component. As another example, the functionality performed by a single component may be performed by two or more components.

Figure 4:
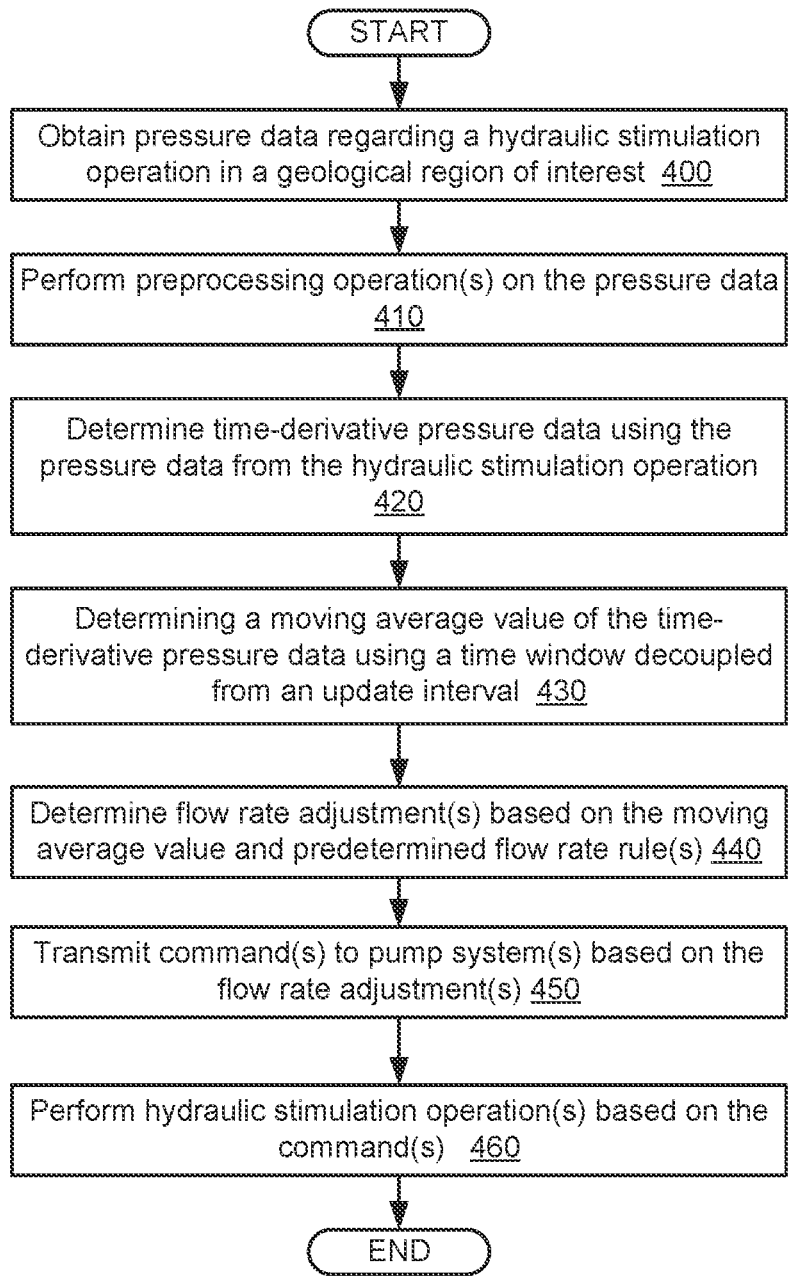
FIG. 4 shows a flowchart in accordance with one or more embodiments.

Turning to FIG. 4, FIG. 4 shows a flowchart in accordance with one or more embodiments. Specifically, FIG. 4 describes a general method that uses flow rate rules based on pressure data to adjust pump flow rates. One or more blocks in FIG. 4 may be performed by one or more components (e.g., hydraulic stimulation manager X (180)) as described in FIGS. 1, 2, and 3. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, pressure data regarding a hydraulic stimulation operation in a geological region of interest in accordance with one or more embodiments. A geological region of interest may be a portion of a geological area or volume that includes one or more formations of interest desired or selected for further stimulation. For example, in hydraulic fracturing, the geological region may correspond to one or more wellbore intervals following a perforation operation. Moreover, pressure data may be based on surface treating pressure measurements that are streamed in real-time over a well network. Alternatively, pressure data may be based on downhole treating pressure measurements that are streamed in real-time over a well network from downhole sensors (e.g., attached to downhole casing string and/or frac plug) disposed in the wellbore, for example, as described in FIG. 5 below. Furthermore, pressure data may be based on one type of pressure sensor and/or a combination of surface and downhole treating pressure measurements. In some embodiments, historical pressure data are used from a previous hydraulic stimulation operation.

Figure 5:
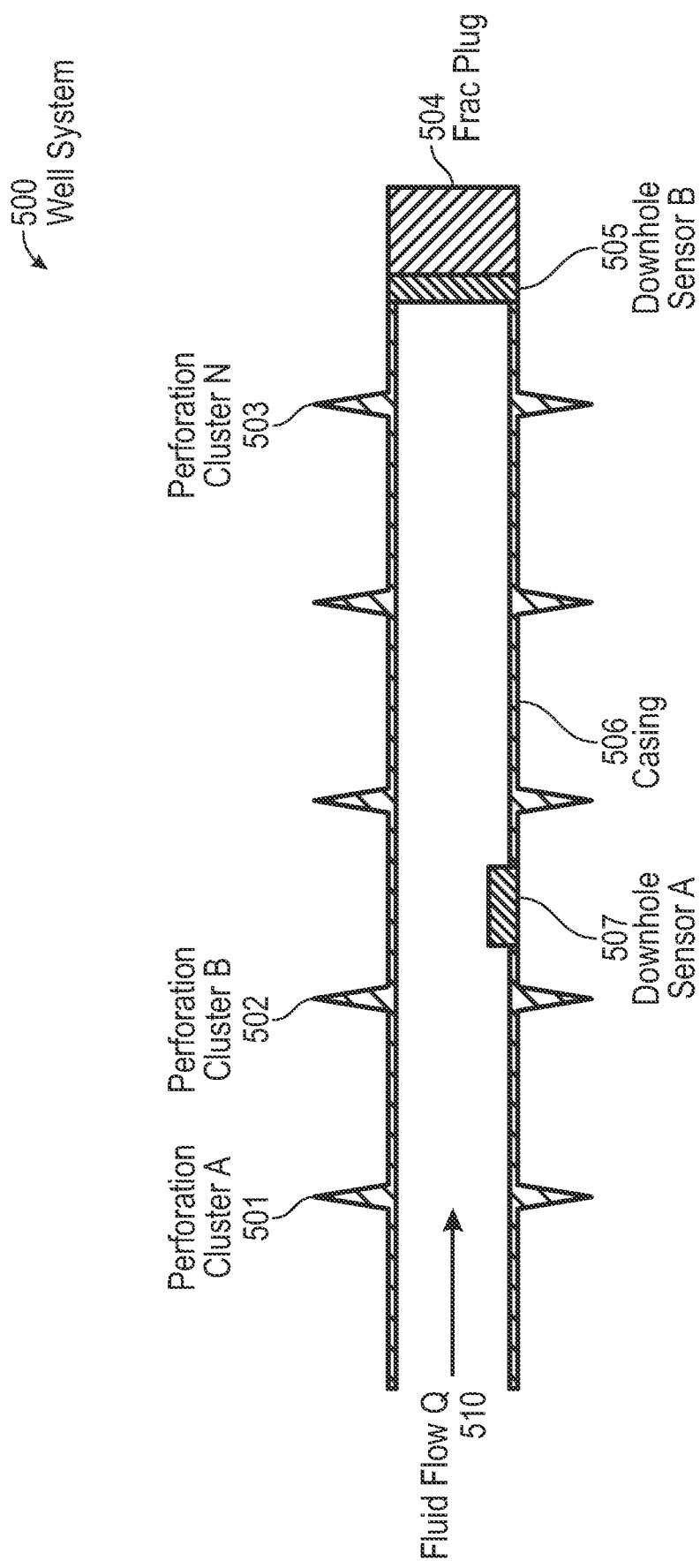
FIGS. 5, 6A, 6B, 6C, 6D, 6E, 6F, 6G, 6H, 6I, 6J, 6K, 6L, 6M, 6N, 6O, 6P, 6Q, 6R, 6S, and 6T show examples in accordance with one or more embodiments.

Turning to FIG. 5, FIG. 5 shows various downhole sensors in accordance with one or more embodiments. In FIG. 5, a well system (500) includes a casing (506) with a frac plug (504) disposed at the end of one section of a wellbore. As shown, the well system (500) includes various perforation clusters (e.g., perforation cluster A (501), perforation cluster B (502), perforation cluster N (503)), where fluid (e.g., fluid flow Q (510)) flows past the perforation clusters. In particular, various plug-and-perf operations may be performed at the well system (500). For example, a plug-and-perf operation may include setting a frac plug at a predetermined depth, and subsequently perforating a zone within a wellbore. In open-hole completions, a ball may be pumped into the wellbore to shift a ball-activated sleeve or port that isolates a previously fractured stage and opens multiple frac sleeves or ports where fracture stimulation fluid may exit the casing and communicate with the formation. Afterwards, frac plugs/balls may dissolve or are drilled out to allow fluid flow from the wellbore. After a stage is completed, another frac plug is set and a new set of perforations are created in a plug-and-perf completion. Similarly, after a stage is completed in an open-hole completion, another ball is pumped into the wellbore. The fracturing fluid process is repeated, i.e., moving up a wellbore from the end (e.g., toe section in a horizontal well) to the beginning (e.g., heal section). A frac plug/ball may operate as a check valve to provide wellbore zonal isolation, e.g., between zones in multistage stimulation treatment. Frac plugs/balls may isolate a lower zone during stimulation but allows fluid flow from below once the stimulation operation ends. Examples of frac plugs/balls include dissolvable frac plugs/balls and composite frac plugs/balls.

During a stimulation operation, fluid flow may be monitored using various downhole sensors (e.g., downhole sensor A (507), downhole sensor B (505)). In particular, a downhole sensor (e.g., downhole sensor A (507)) may be coupled to the casing (506), while another downhole sensor (e.g., downhole sensor B (505)) may be coupled to the frac plug (504). However, other configurations of downhole sensors are contemplated within a wellbore or well system.

Returning to FIG. 4, in Block 410, one or more preprocessing operations are performed on pressure data in accordance with one or more embodiments. In particular, a preprocessing operation may include a smoothing operation performed to a pressure curve of acquired pressure data. For example, a smoothing operation may use a Discrete Fourier Transform with a low-pass filter, or alternatively use a median filter or any other smoothing methods, to remove pressure transients. After preprocessing, the preprocessed pressure data may be processed according to the workflow in FIG. 4, e.g., a hydraulic stimulation manager may determine time-derivative pressure data using a smoothed pressure curve. In some embodiments, flow rate adjustments are based on time-derivative pressure data using the smoothed pressure curve without utilizing moving average values of the time-derivative pressure data (e.g. Block 430 is eliminated from the workflow in FIG. 4). In other embodiments, a smoothing operation may be applied to the time-derivative pressure data determined from the raw pressure data. In such embodiments, flow rate adjustments are based on smoothed time-derivative pressure data using the raw pressure curve.

In some embodiments, one or more preprocessing operations are applied to other types of data inputs for determining flow rates for a pump system. For example, a flow rate rule may use surface acoustic sensing data to determine a flow rate adjustment. Surface acoustic sensing data may be acquired using an active acoustic device attached to a wellhead. The active acoustic device may continuously emit and record reflected acoustic signals to give an indication about fracture propagation intensity (e.g., higher signals may be associated with faster fracture initiation or propagation while lower signals with slower fracture initiation or propagation). In some embodiments, downhole sensor data, such as Distributed Acoustic Sensing (DAS) data, may be preprocessed for use by a hydraulic stimulation manager to monitor a hydraulic stimulation operation.

In Block 420, time-derivative pressure data are determined using pressure data from a hydraulic stimulation operation in accordance with one or more embodiments. For example, a hydraulic stimulation manager may use available pressure data or preprocessed pressure data to determine time-derivative pressure data (i.e., dp/dt). Likewise, time-derivative pressure data may correspond to a pressure curve that is further analyzed by a hydraulic stimulation manager.

In Block 430, a moving average value of time-derivative pressure data are determined using a time window decoupled from an update interval in accordance with one or more embodiments. A moving average value may correspond to an average of time-derivative pressure data over a sampled period, e.g., defined by a time window's size. While moving average values may be obtained for a hydraulic stimulation operation, the moving average value may only be analyzed at different times designated by an update interval. For example, the update interval may specify a minimum time for determining flow rate adjustments with respect to one or more pump systems. By using moving average values, flow rate processing may reduce or eliminate noise levels that are inherent in acquired pressure data and corresponding time-derivative pressure data. In other words, moving average values may continuously reflect the rate of change in a pressure curve with less interference from localized noise in pressure sensor measurements.

Moreover, the time window may be decoupled from the update interval to provide a flexible architecture for flow rate processing. Rather than evaluating pressure data in one analysis stage and adjusting flow rates in a subsequent analysis stage, a hydraulic stimulation manager may determine an optimum time window and update interval for adjusting flow rates. Such flow processing techniques may account for different levels of noise that may be present in different hydraulic stimulation environments. Thus, one set of time window parameters may be used in a noisy operation, while another set of time window parameters may work better in a different less noisy environment. Likewise, different types of desired fracture networks may also result in the use of different update intervals and time windows. In some embodiments, time window sizes and update intervals may change during a particular hydraulic stimulation operation, e.g., as noise increases or decreases. For illustration purposes, FIGS. 6M-6T and the accompanying description below provide examples of time window decoupling.

In some embodiments, a hydraulic stimulation manager may obtain a user selection of one or more parameters relating to a time window, e.g., defining a particular window size, a particular starting time step for updating a flow rate based moving average values, etc. In some embodiments, an optimum window size is automatically determined, e.g., by a reinforcement learning algorithm or another machine-learning algorithm.

In Block 440, one or more flow rate adjustments are determined based on one or more moving average values and one or more predetermined flow rate rules in accordance with one or more embodiments. For example, a flow rate rule may include one or more of the following input parameters: starting rate ($R_0$), rate increment ($R_{in}$), target rate ($R_f$), maximum allowable surface treating pressure ($P_{max}$), window size ($W_s$), and update interval ($T_u$). Some input parameters may remain constant during a hydraulic stimulation operations (or between hydraulic stimulation operations), while other input parameters, such as window size and rate increment (i.e., $W_s$ and $R_{in}$) may change. For example, the objective of a hydraulic stimulation operation may be to increase the flow rate from a starting flow rate (e.g., $R_0$=5 bbl/min) to a target flow rate (e.g., $R_f$=30 bbl/min) while keeping the maximum allowable surface treating pressure below a particular value (e.g., $P_{max}$=4000 psi).

In some embodiments, flow rate adjustments are based on smoothed pressure data without moving average values. For example, the time-derivative pressure data may be based on processed pressure data using a smoothing operation. As such, no time window may be applied to underlying pressure data, and Block 440 may be modified accordingly.

In some embodiments, one or more flow rate rules include one or more thresholds with respect to one or more hydraulic stimulation parameters. For example, multiple thresholds of moving average values (i.e., $dp/dt_{avg,t}$) may be used to adjust the flow rate accordingly. As such, where $dp/dt_{avg,t}$≤Threshold 1, then $R_t$=$R_{t-1}$+$R_{in}$. If $dp/dt_{avg,t}$≤Threshold 2, then $R_t$=$R_{t-1}$+x*$R_{in}$ where x is a specified number (e.g. x=2) assuming Threshold 2<Threshold 1.

In Block 450, one or more commands are transmitted to one or more pump systems based on one or more flow rate adjustments in accordance with one or more embodiments. Based on a particular flow rate adjustment, a command may be fashioned correspond to a particular stimulation parameter value, e.g., flow rate, pressure value, update interval value, etc. Thus, the command may be a control signal, e.g., generated by a control system, or a network message transmitted over a well network that adjusts one or more stimulation parameters. For example, a command may be transmitted from a hydraulic stimulation manager or control system on a surface of a well site to one or more pump controllers in one or more pump systems. The pump systems may be similar to the pump systems (121, 122, 123) described above in FIG. 1 and the accompanying description. In some embodiments, one or more commands may adjust stimulation parameters, e.g., for one or more pump systems, of one or more hydraulic stimulation operations. For more information on hydraulic stimulation operations, see FIGS. 1 and 2 and the accompanying description above.

In Block 460, one or more hydraulic stimulation operations are performed based on one or more commands in accordance with one or more embodiments. As described in FIG. 4, the process for increasing the pumping flow rate may be adjusted for a hydraulic stimulation operation, e.g. a fast flow rate ramp may be desired rather than a slow flow rate ramp. With respect to manual flow rate adjustments, large inconsistency in stage-to-stage executions may result that potentially lead to significant non-uniform distributions of fluid and proppant among different perforation clusters within a given stimulation stage. In regard to hydraulic fracturing, this non-uniform distribution may result in poor performance. Thus, a hydraulic stimulation manager may implement autonomous flow rate control for one or more hydraulic stimulation operations using flow rate rules and moving average values.

In some embodiments, while the process in FIG. 4 illustrates a sequential series of operations, the process may further include one or more iterative operations, such as an update loop similar to the one described below in FIG. 7 and the accompanying description. For example, time-derivative pressure data may be iteratively obtained and analyzed within an update loop by a hydraulic stimulation manager in order to determine whether to make one or more flow rate adjustments.

Figure 6A:
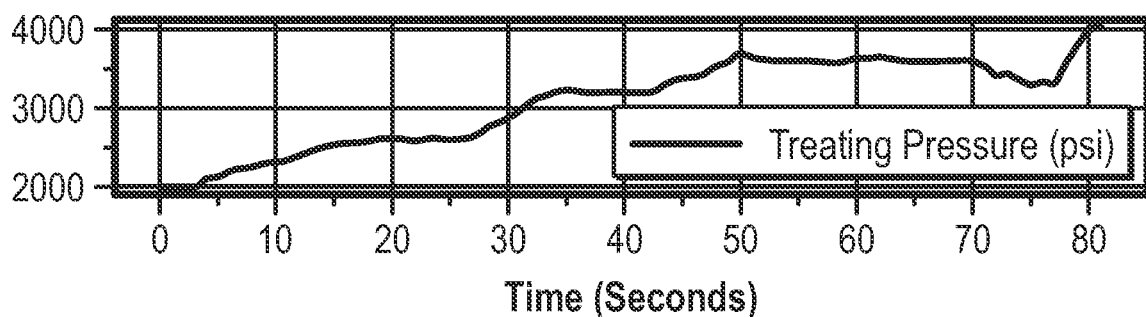
Figure 6B:
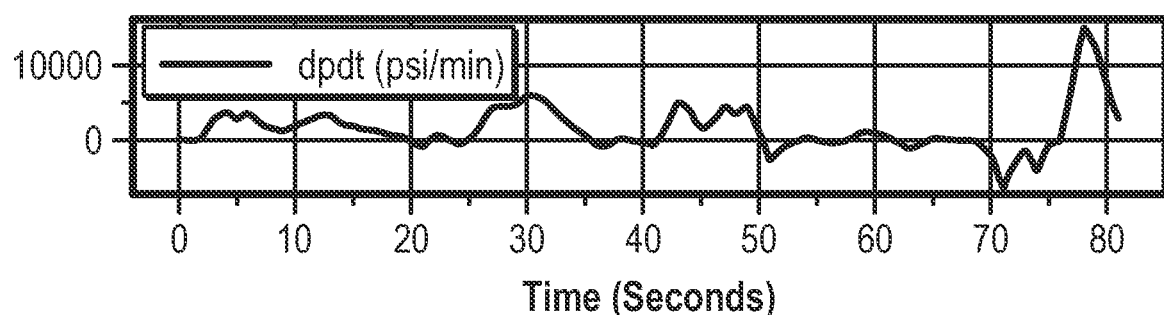
Figure 6C:
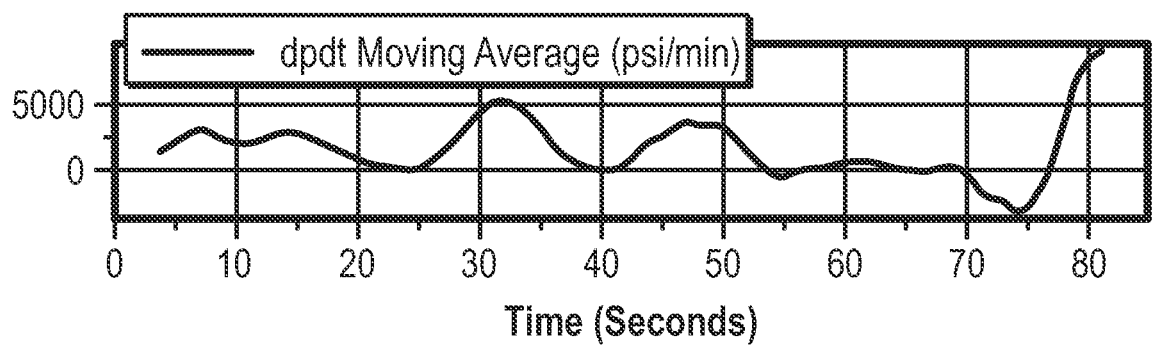
Figure 6D:
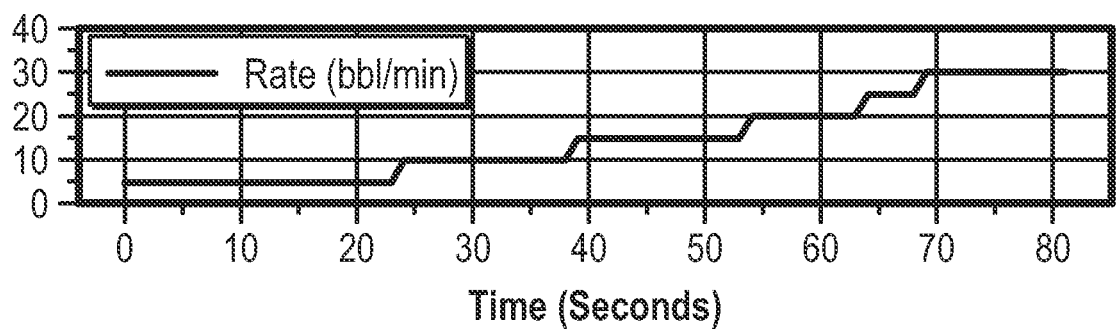
Figure 6E:
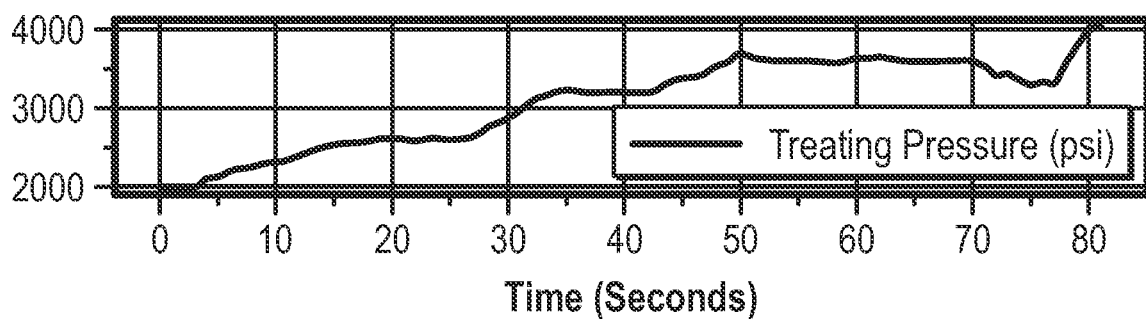
Figure 6F:
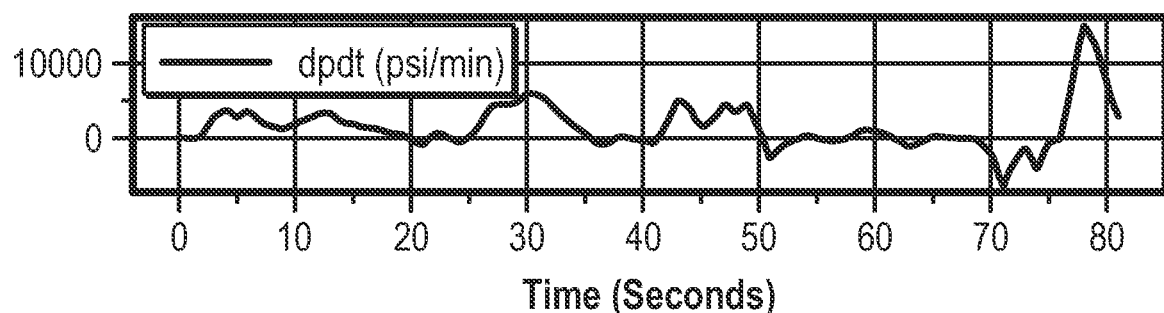
Figure 6G:
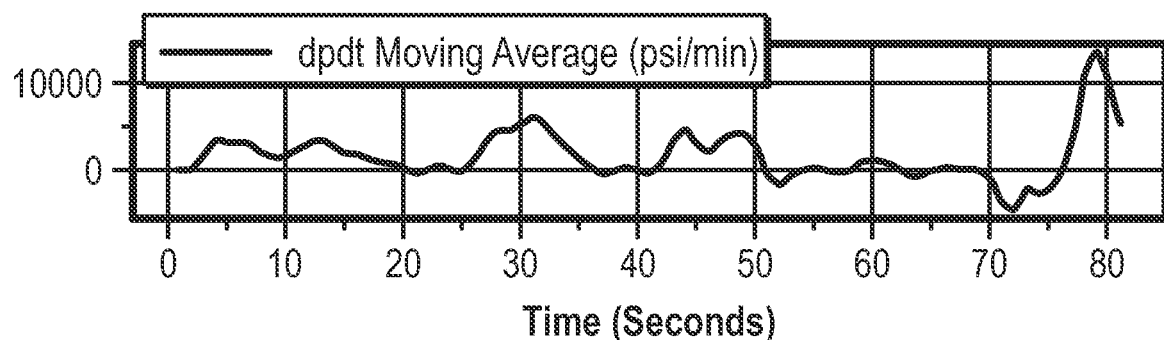
Figure 6H:
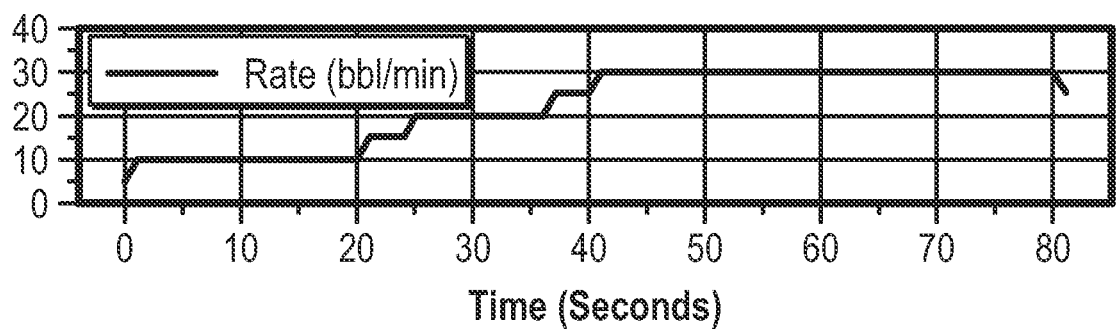
Figure 6I:
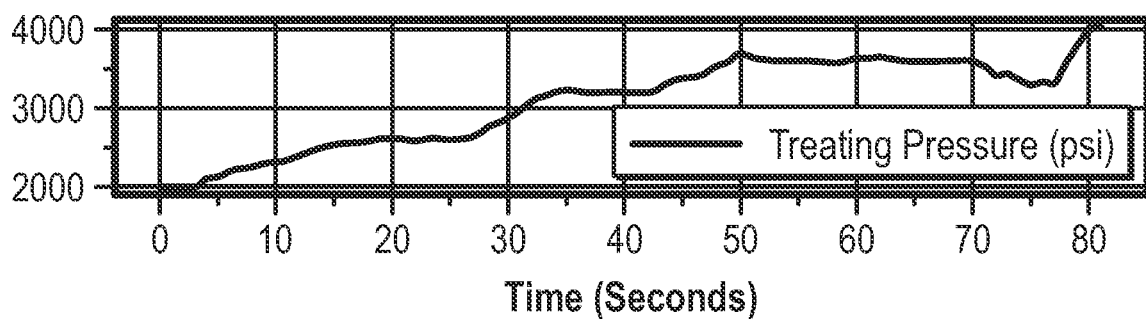
Figure 6J:
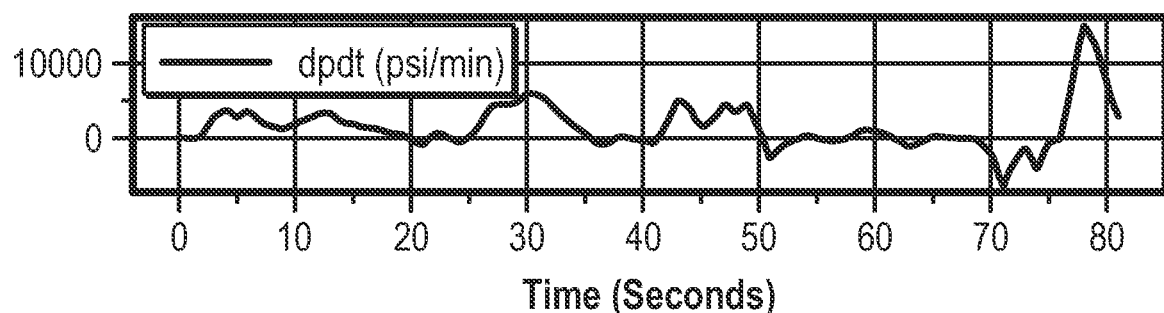
Figure 6K:
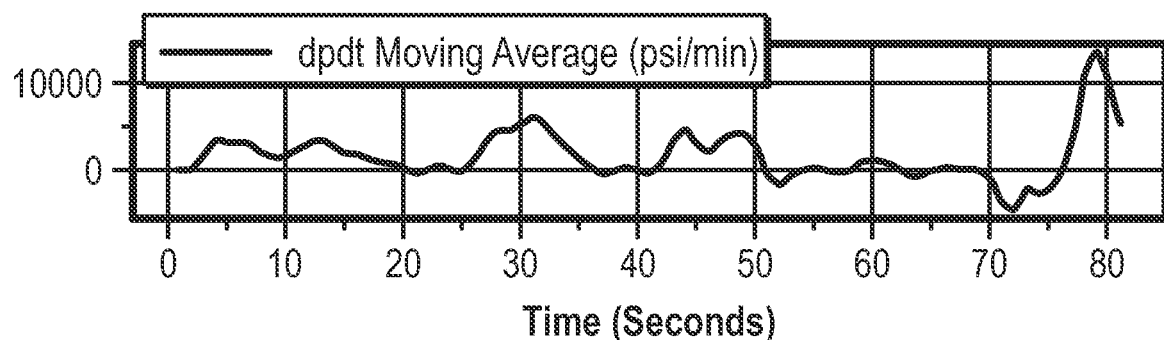
Figure 6L:
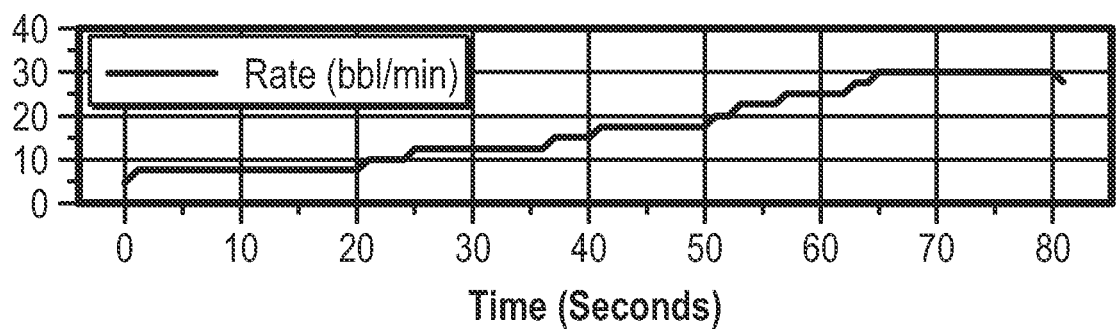
Figure 6M:
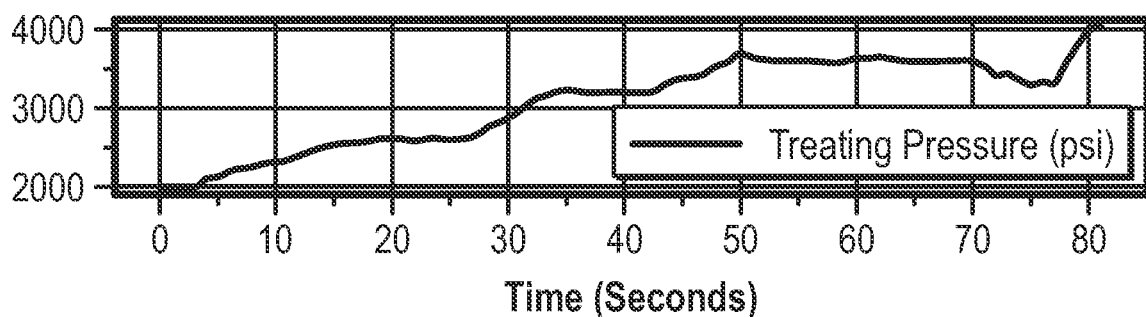
Figure 6N:
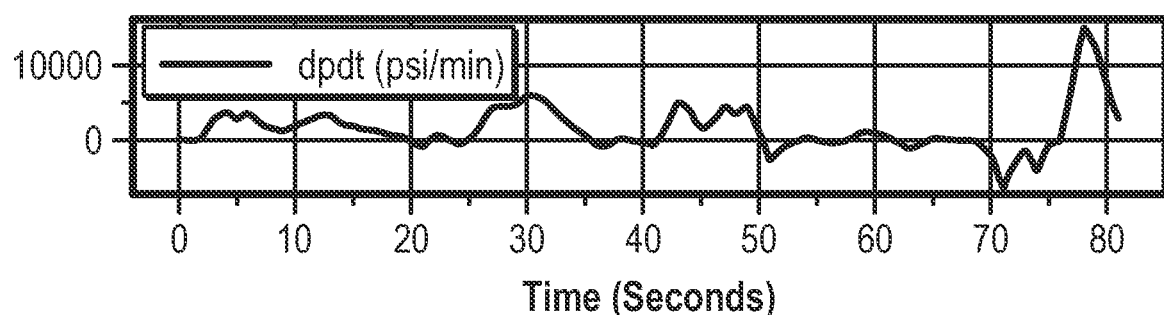
Figure 6O:
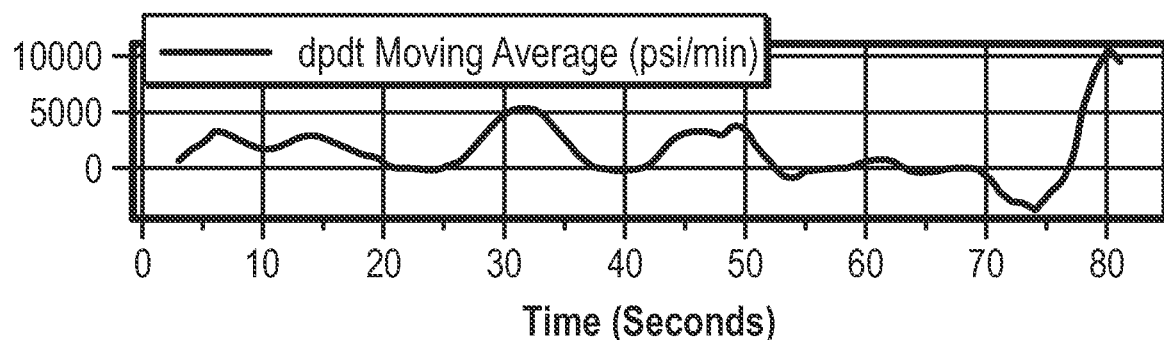
Figure 6P:
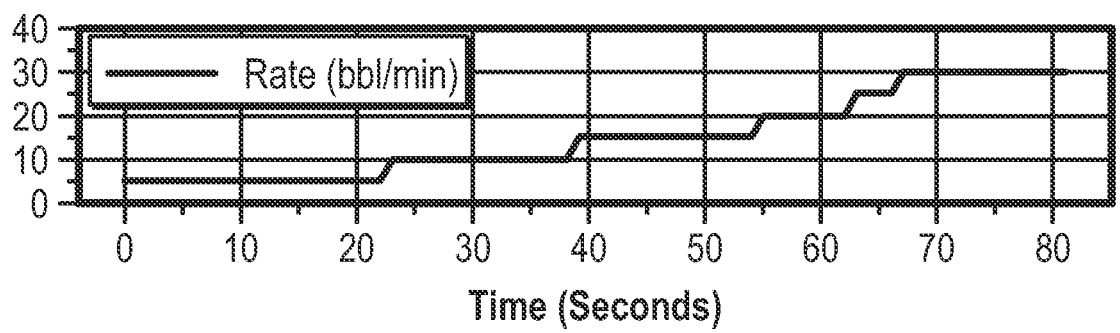
Figure 6Q:
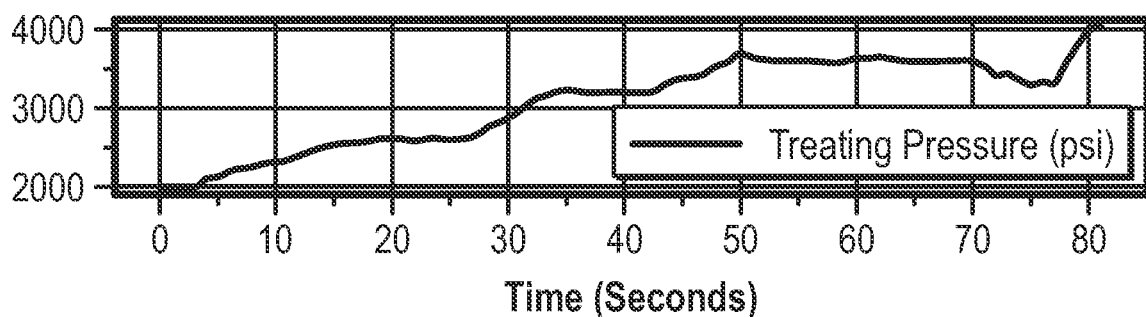
Figure 6R:
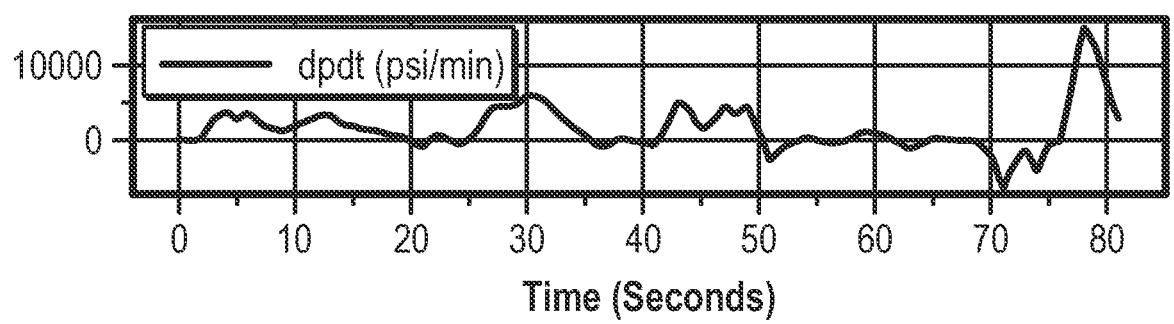
Figure 6S:
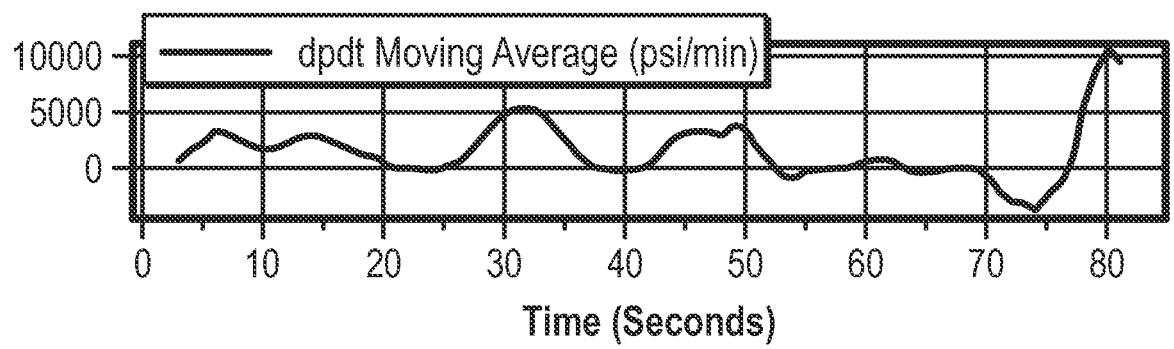
Figure 6T:
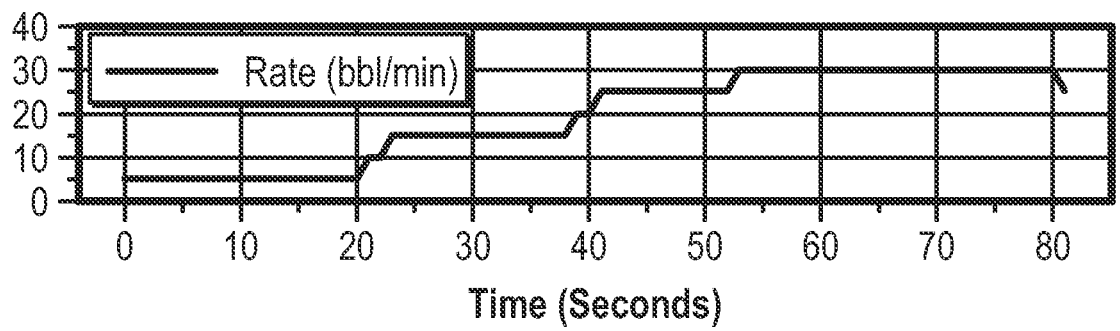

Turning to FIGS. 6A-6T, FIGS. 6A-6T provide examples of flow rate adjustments in accordance with one or more embodiments. The following examples are for explanatory purposes only and not intended to limit the scope of the disclosed technology. In FIGS. 6A, 6B, 6C, and 6D, a flow rate is determined using a time window with a window size of five time steps (i.e., $W_s=5$) and a rate increment ($R_{in}$) of 5 bbl/min. In particular, FIG. 6A illustrates the acquired pressure data, FIG. 6B illustrates the time-derivative pressure data, FIG. 6C illustrates moving average values based on the selected time window, and FIG. 6D illustrates the corresponding flow rate adjustments of the respective hydraulic stimulation operation. As such, the flow rate rules in FIGS. 6A-6D use the following inputs: $R_0=5$ bbl/min, $R_{in}=5$ bbl/min, $R_f=30$ bbl/min, $P_{max}=4000$ psi, and $W_s=T_u=5$.

In FIGS. 6E, 6F, 6G, and 6H, a flow rate is determined using a time window with a window size of 2 time steps (i.e., $W_s=2$) and a rate increment of 5 bbl/min. Similar to FIGS. 6A, 6B, 6C, and 6D, FIGS. 6E, 6F, 6G, and 6H correspond to pressure date, time-derivative pressure data, moving average values, and flow rate adjustments, respectively, for a hydraulic stimulation operation. As such, the flow rate rules in FIGS. 6E-6H use the following inputs: $R_0=5$ bbl/min, $R_{in}=5$ bbl/min, $R_f=30$ bbl/min, $P_{max}=4000$ psi, $W_s=T_u=2$. As may be seen from FIGS. 6D and 6H, flow rate adjustments may be more sensitive to fluctuations in treating pressure as the window size is decreased.

In FIGS. 6I, 6J, 6K, and 6L, a flow rate is determined using a time window with a window size of 2 time steps (i.e., $W_s=2$) and a rate increment of 2.5 bbl/min. Similar to FIGS. 6A, 6B, 6C, and 6D, FIGS. 6I, 6J, 6K, and 6L correspond to pressure date, time-derivative pressure data, moving average values, and flow rate adjustments, respectively, for a hydraulic stimulation operation. As such, the flow rate rules in FIGS. 6I-6L use the following inputs: $R_0=5$ bbl/min, $R_{in}=2.5$ bbl/min, $R_f=30$ bbl/min, $P_{max}=4000$ psi, $W_s=T_u=2$. As may be seen from FIGS. 6H and 6L, reducing the rate increment resulted in a more gradual rate increase using the same window size.

In FIGS. 6M, 6N, 6O, 6P, 6Q, 6R, 6S, and 6T, FIGS. 6M-6T illustrate an example of decoupling a window size and an update interval. In FIGS. 6M, 6N, 6O, and 6P, a flow rate is determined using a time window with a window size of four time steps (i.e., $W_s=4$) that is the same size as an update interval of 4 time steps (i.e., $T_u=4$). In contrast, FIGS. 6Q, 6R, 6S, and 6T illustrate a different scenario where the flow rate is determined using a time window with a window size of four time steps (i.e., $W_s=4$) that is not the same size as an update interval of 2 time steps (i.e., $T_u=2$). Accordingly, the flow rate adjustments illustrated in FIGS. 6P and 6T are different despite the same treating pressure data.

Figure 7:
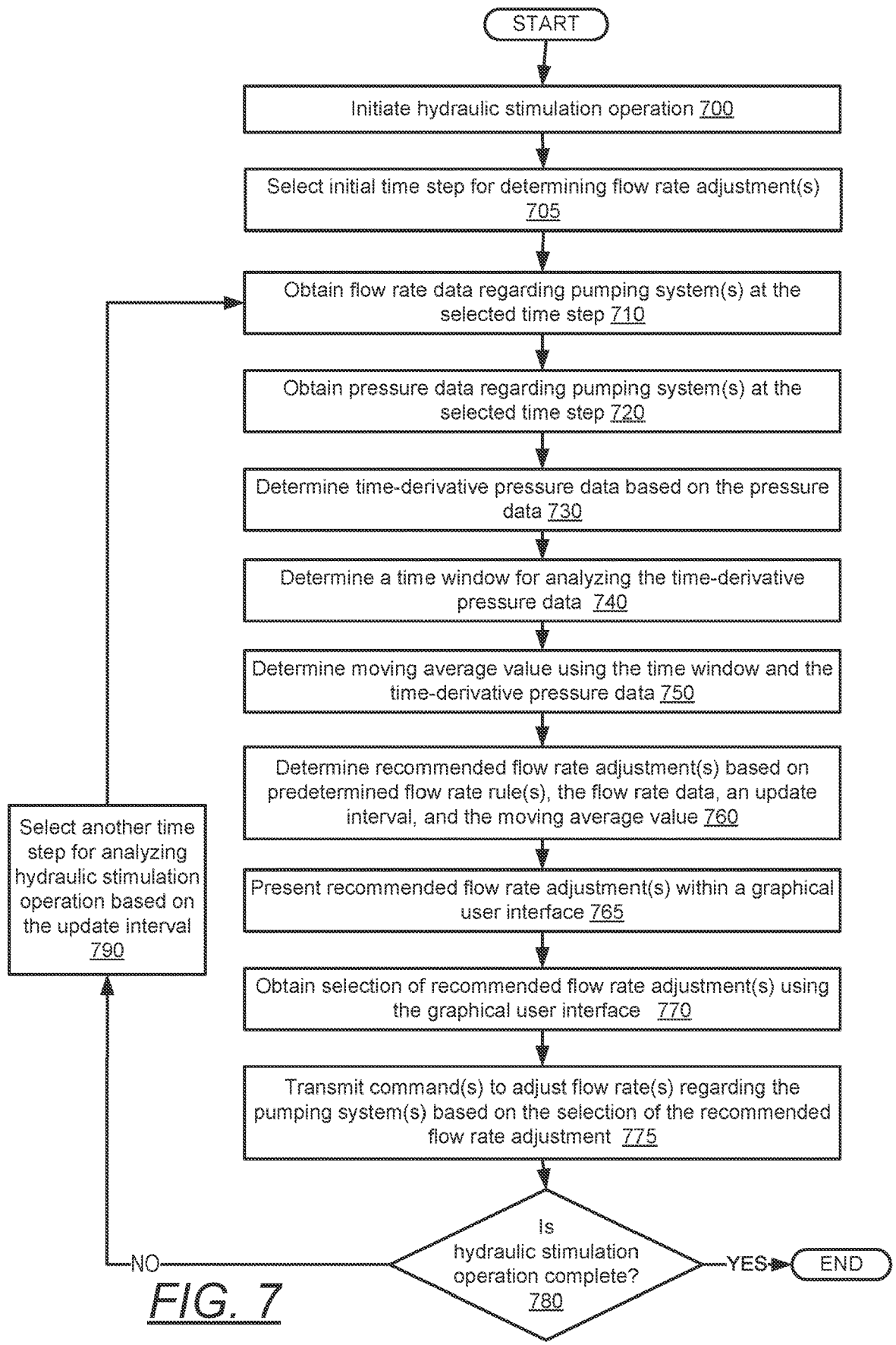
FIG. 7 shows a flowchart in accordance with one or more embodiments.

Turning to FIG. 7, FIG. 7 shows a flowchart in accordance with one or more embodiments. Specifically, FIG. 7 describes a specific method that uses flow rate rules to determine recommended flow rates adjustments for selection by a user. One or more blocks in FIG. 7 may be performed by one or more components (e.g., hydraulic stimulation manager X (180)) as described in FIGS. 1, 2, and 3. While the various blocks in FIG. 7 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 700, a hydraulic stimulation operation is initiated in accordance with one or more embodiments. In particular, a hydraulic stimulation operation may be automatically initiated by a hydraulic stimulation manager. In some embodiments, a human operator provides one or more user inputs to begin a hydraulic stimulation operation, e.g., at a fluid control system, a pump system, and/or a proppant system.

In Block 705, an initial time step is selected for determining one or more flow rate adjustments in accordance with one or more embodiments. For example, the initial time step may be a current time step for analyzing for possible flow rate adjustments or a start of a pump system operation. Likewise, the initial time step may be a time step zero at a starting rate ($R_0$) with a pumping flow rate ($R_t$).

In Block 710, flow rate data regarding one or more pumping systems are obtained for a selected time step in accordance with one or more embodiments. For example, flow rate data may be acquired from one or more flow meters for use in determining flow rate adjustments based on one or more flow rate rules. In some embodiments, flow rate data are not collected for determining flow rate adjustments.

In Block 720, pressure data regarding one or more pumping systems are obtained at a selected time step in accordance with one or more embodiments. For example, Block 720 may be similar to Block 400 described above in FIG. 4 and the accompanying description.

In Block 730, time-derivative pressure data are determined based on pressure data in accordance with one or more embodiments. For example, Block 730 may be similar to Block 420 described above in FIG. 4 and the accompanying description.

In Block 740, a time window is determined for analyzing time-derivative pressure data in accordance with one or more embodiments. In some embodiments, for example, the time window may be a dynamic time window that has a window size adjusted during a hydraulic stimulation operation. Window size adjustments may be performed in response to detecting increases and/or decreases in noise within a hydraulic stimulation operation.

In some embodiments, moving average values and/or smoothed values (e.g. using Discrete Fourier Transform with a low-pass filter or any other smoothing methods) are determined for non-pressure data, such as density data or acoustic sensing data. In situations where sensor data has significant interference or noise during a hydraulic stimulation operation, respective moving average values and/or smoothed values of non-pressure data may be determined for use in flow rate adjustments.

In Block 750, a moving average value is determined using a time window and time-derivative pressure data in accordance with one or more embodiments. For example, Block 750 may be similar to Block 430 described above in FIG. 4 and the accompanying description. In some embodiments, smoothed pressure data is used to determine time-derivative pressure data for recommended flow rate adjustments (i.e. moving average values of time-derivative pressure data are not utilized for recommended flow rate adjustments).

In Block 760, one or more recommended flow rate adjustments are determined based on one or more predetermined flow rate rules, flow rate data, an update interval, and a moving average value in accordance with one or more embodiments. At each time step, a hydraulic stimulation manager may determine a recommended flow rate adjustment based on moving average values of time-derivative pressure data. A recommended flow rate adjustment may be determined according to an update interval. Likewise, two or more recommended flow rate adjustments may be determined and provided to a user device. For example, moving average values may be used to determine a flow rate adjustment schedule that may be shown to a user within a graphical user interface. As additional time steps proceed during a hydraulic stimulation operation, the one or more flow rate adjustment schedules may be modified accordingly.

In some embodiments, a hydraulic stimulation manager performs a flow rate algorithm. Initially, the hydraulic stimulation manager may verify whether four criteria are satisfied: 1) is the current time step (t) divisible by the update interval ($T_u$); 2) is the flow rate at the previous time step ($R_{t-1}$) less than the target flow rate ($R_f$)?; 3) is the treating pressure of the hydraulic stimulation operation at the current time step ($P_t$) less than the maximum allowable treating pressure ($P_{max}$); and 4) is the moving average of the pressure derivative at the current time step ($dp/dt_{avg,t}$) less than or equal to zero. If all four criteria above are satisfied, then a recommended flow rate adjustment is determined to be an adjusted flow rate that includes the previous flow rate at the previous time step ($R_{t-1}$) and an additional flow rate increment ($R_{in}$). Afterwards, the algorithm may move to the next time step (t+1) and subsequent time steps to determine whether another flow rate adjustment is desired.

Keeping with the flow rate algorithm, if one or more of the four criteria above are not satisfied, the flow rate algorithm may verify if two additional criteria are satisfied: 1) is the current time step (t) divisible by the update interval ($T_u$)?; and 2) is the treating pressure at the current time step ($P_t$) greater than or equal to the maximum allowable treating pressure ($P_{max}$). If both additional criteria are satisfied, a recommended flow rate adjustment may be the flow rate at the previous time step ($R_{t-1}$) reduced by a single flow rate increment ($R_{in}$). The flow rate algorithm may proceed to the next time step (t+1) for determining additional flow rate adjustments. However, if one or both of the two additional criteria above are violated, the current flow rate may be recommended, i.e., the flow rate at the previous time step ($R_{t-1}$).

In some embodiments, a flow rate algorithm is based on flow rate data based on measured pumping rates. For example, a recommended flow rate adjustment may be grounded with a measured flow rate. In particular, measured pressure and measured flow rate data may be acquired continuously. Accordingly, a hydraulic stimulation manager may use an additional rule to determine whether the difference between the recommended flow rate at a current time step and the measured flow rate in the previous time step is greater than a certain threshold (e.g. greater than one rate increment). If this condition is satisfied, the recommended flow rate may become the same as the recommended rate in the previous time step.

In Block 765, one or more recommended flow rate adjustments are presented within a graphical user interface in accordance with one or more embodiments.

Figure 8A:
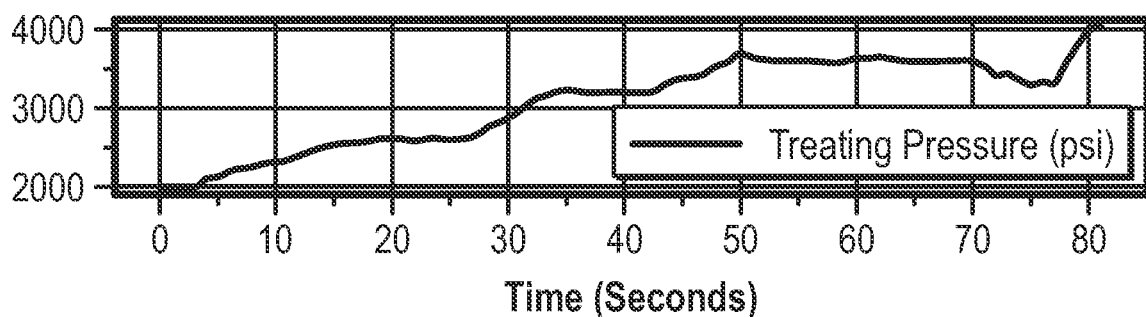
FIGS. 8A, 8B, 8C, 8D, and 8E show examples in accordance with one or more embodiments.
Figure 8B:
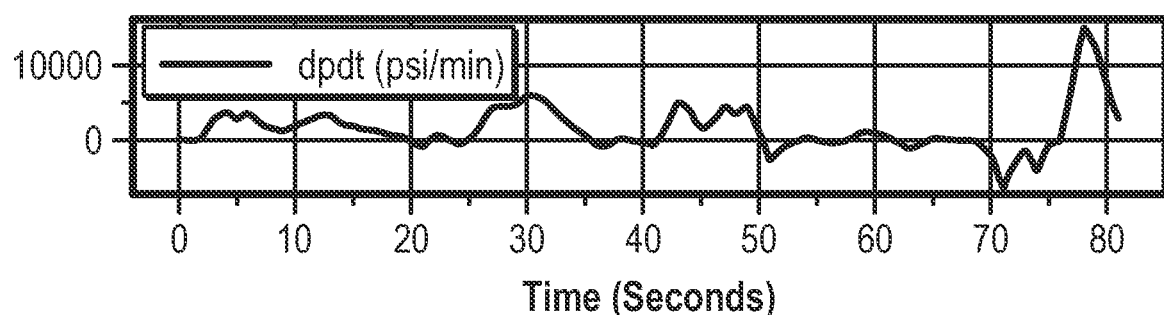
Figure 8C:
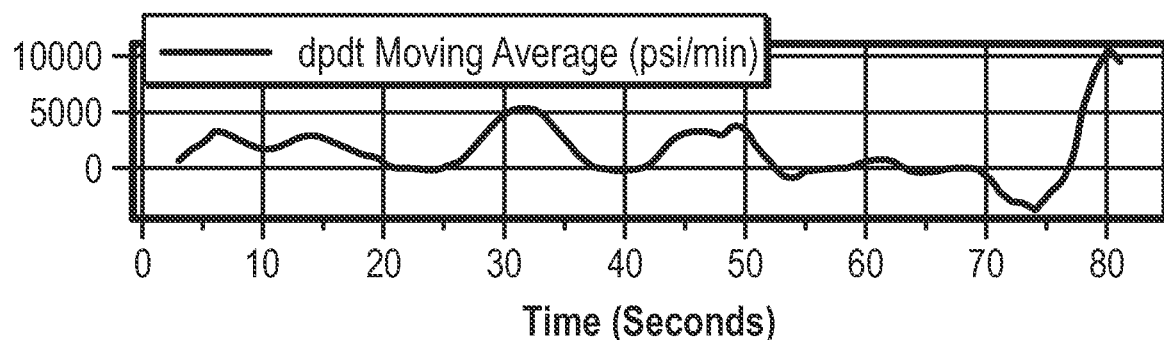
Figure 8D:
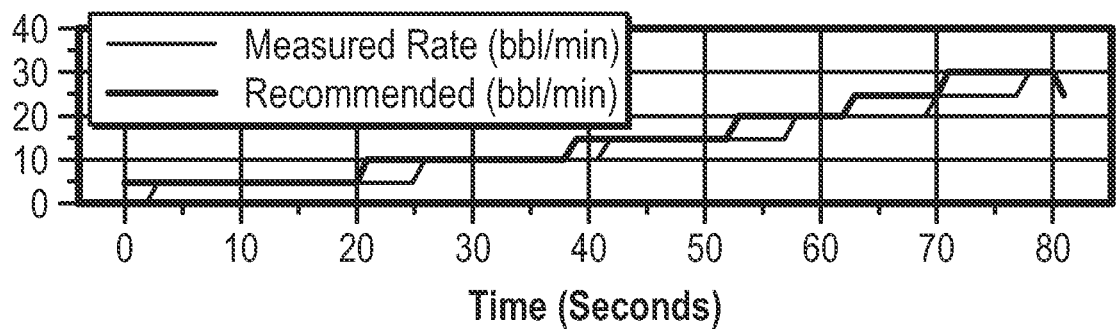

Turning to FIGS. 8A, 8B, 8C, and 8D, FIGS. 8A-8D provides an example of determining a recommended flow rate adjustment in accordance with one or more embodiments. In FIG. 8A, the treating pressure is the same as the pressure data shown in FIGS. 6A, 6E, 6I, 6M, and 6Q described above. As such, the time-derivative pressure data in FIG. 8B is the same as the time-derivative data in FIGS. 6B, 6F, 6J, 6N, and 6R described above. Accordingly, the moving average values in FIG. 8C are based on a time window with a window size Ws=4 seconds. In FIG. 8D, a recommended flow rate is determined that is based on an update interval of Tu=2 seconds and a measured flow rate. Where FIGS. 6A-6T above describe flow rate rules that are independent of measured flow rate data except for when a target flow rate is reached, the flow rate recommendation algorithm here checks if the difference between the recommended rate at a current time step and the measured rate in the previous time step is greater than a certain threshold (e.g. greater than one rate increment). If this condition is satisfied, the recommended flow rate becomes the same as the recommended rate in the previous time step.

Furthermore, by having the flow rate rules in FIGS. 8A-8D depend on measured flow rate data from a previous time step, the flow rate processing may handle lag times in flow rate adjustments in real-time. This may allow a pump system to keep up with recommended flow rate adjustments. Thus, various flow rate rules may implement an advisory system for flow rate control where the hydraulic stimulation manager obtains acquired pressure data and flow rate data continuously, while also recommending flow rate adjustments based on a pre-defined update interval. The recommended flow rate may be displayed for a human operator to adjust the flow rate manually (rather than using a completely autonomous system). An advisory system may be used in a large-scale application where an edge device displays recommended rate adjustments while continuously reading pressure data and flow rate data.

Returning to FIG. 7, in Block 770, a selection of one or more recommended flow rate adjustments is obtained using a graphical user interface in accordance with one or more embodiments. For example, a hydraulic stimulation manager may communicate with one or more user devices, such as human machine interfaces located at a well site. A user may then select which recommended flow rate to use for a hydraulic stimulation operation.

In Block 775, one or more commands are transmitted to adjust one or more flow rates regarding one or more pumping systems based on a selection of one or more recommended flow rate adjustments in accordance with one or more embodiments.

In Block 780, a determination is made whether a hydraulic stimulation operation is complete in accordance with one or more embodiments. For example, a hydraulic stimulation operation may be designated a particular time frame for completion, e.g., when the pump systems coupled to a flow manifold are designated for terminating operations. Likewise, the process described in FIG. 7 may be terminated once the target flow rate is achieved. Where the hydraulic stimulation operation is complete, this process may end. Where the hydraulic stimulation operation is unfinished, the process may proceed to Block 790.

In Block 790, another time step is selected for analyzing the hydraulic stimulation operation based on an update interval in accordance with one or more embodiments. For example, time steps may be increment according to a particular time step interval, such as 1 second. Likewise, the next time step may be selected based on an update interval. In some embodiments, the increment between time steps changes, e.g., due to a detection of increased noise during the hydraulic stimulation operation.

While FIGS. 4 and 7 above describe various embodiments for autonomous rate control in hydraulic stimulation operations, such as hydraulic fracturing treatments, other embodiments are contemplated that include various rate control processes (or other control processes) that need to be adjusted in response to variables in a surrounding environment. For example, flow rate adjustments may be determined using similar techniques in any situations where a master controller manages one or more pump systems.

Figure 8E:
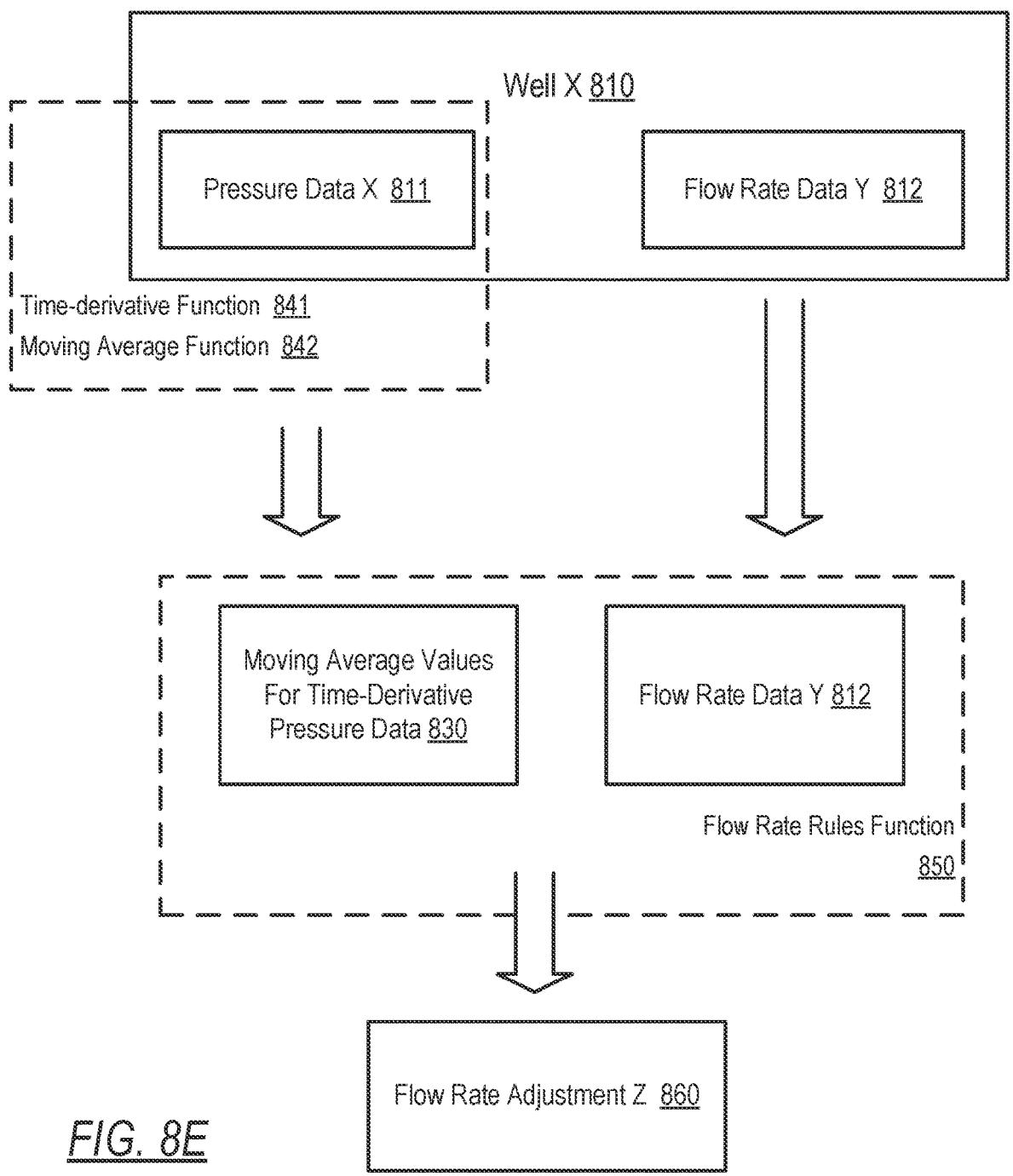

Turning to FIG. 8E, FIG. 8E provides an example of determining flow rate adjustments in accordance with one or more embodiments. The following example is for explanatory purposes only and not intended to limit the scope of the disclosed technology. In FIG. 8E, FIG. 8E shows well X (810) with corresponding sensor data, i.e., pressure data X (811) and flow rate data Y (812). With respect to the pressure data X (811), a time-derivative function (841) is initially applied to produce time-derivative pressure data (not shown). Afterwards, a moving average function (842) is applied to the time-derivative pressure data to produce moving average values for time-derivative pressure data (830). Using the moving average values (830) and the flow rate data Y (812), a flow rate rules function (850) determines a flow rate adjustment Z (860) for a pump system.

In some embodiments, pressure data referred to in FIGS. 4, 5, 6A-6T, 7, and 8A-8D may be based on: 1) surface treating pressure measurements that are streamed in real-time over a well network from wellhead and/or pump surface sensors; 2) downhole treating pressure measurements that are streamed in real-time over a well network from downhole sensors (e.g., sensors attached to downhole casing string and/or frac plug and/or any other downhole completion equipment) disposed in the wellbore; or 3) both and/or any given combination of surface and downhole treating pressure measurements. The advantage of using downhole pressure measurements may be that the formation response to a hydraulic stimulation operation is captured much faster compared to surface treating pressure measurements, where pressure may be sensed a very long distance from the target formation. In addition, downhole pressure measurements replace the usual estimation of friction pressure due to fluid pumping down the casing string with actual downhole measurements, and hence more accurate representation of formation response may be captured during a fracturing operation.

Figure 9:
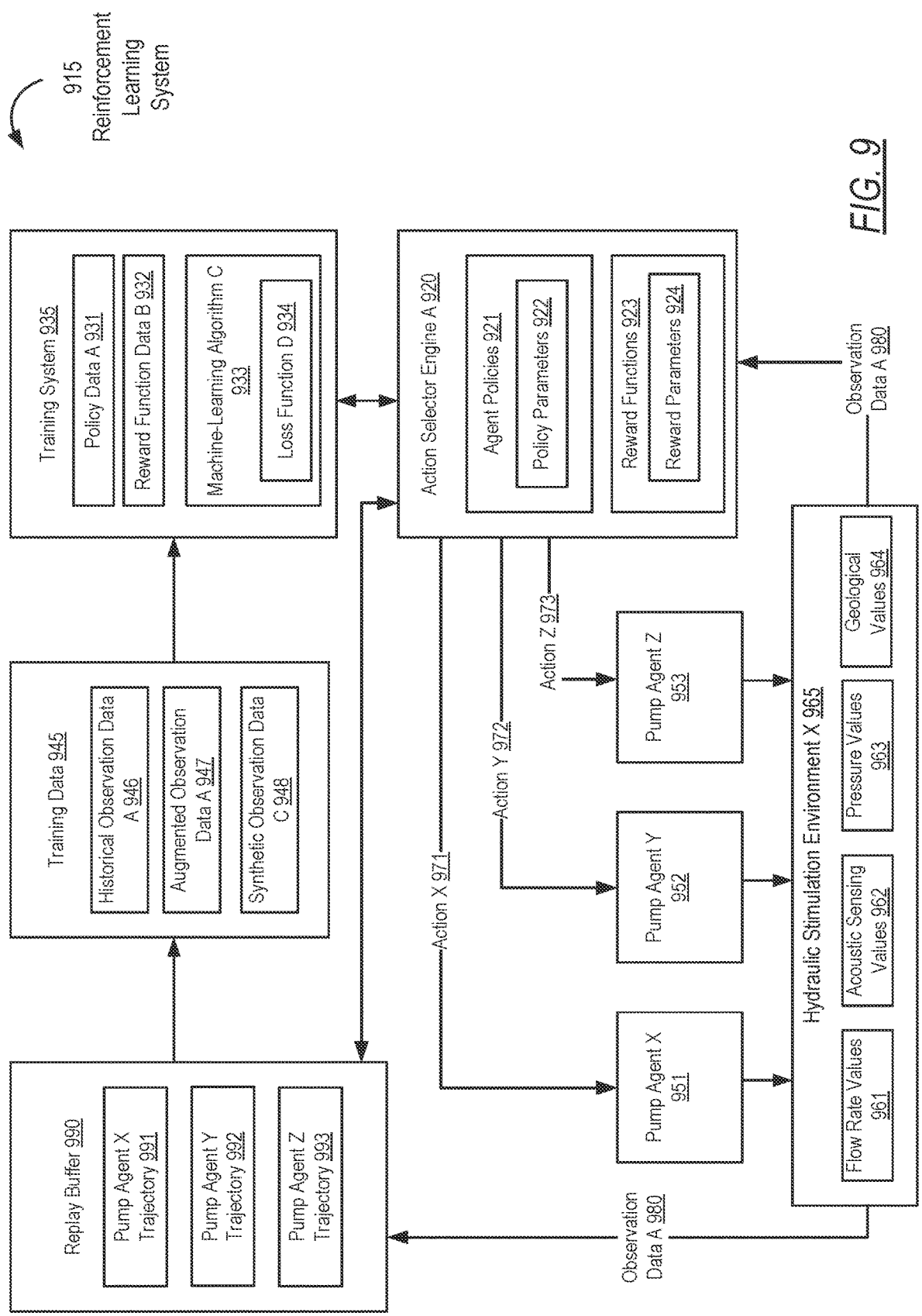
FIG. 9 shows a system in accordance with one or more embodiments.

Turning to FIG. 9, FIG. 9 illustrates a reinforcement learning system in accordance with one or more embodiments. As shown in FIG. 9, a reinforcement learning system (e.g., reinforcement learning system (915)) may include one or more pump agents (e.g., pump agent X (951), pump agent Y (952), pump agent Z (953)) that include hardware and/or software to perform one or more actions (e.g., action X (971), action Y (972), action Z (973)). In some embodiments, for example, a pump agent may correspond to a pump system, such as pump systems (121, 122, 123) in FIG. 1 and the accompanying description. In another embodiment, the pump agent may be a pump controller in a particular pump system. Likewise, in some embodiments, pump agents merely correspond to a hydraulic stimulation manager's control of a hydraulic stimulation operation as distributed among multiple pump systems. As such, the actions (971, 972, 973) may correspond to commands by a hydraulic stimulation manager or specific pump operations implemented by pump controllers.

Keeping with FIG. 9, reinforcement learning algorithms may determine actions based on an agent's interaction with a particular environment. In other words, an environment may define one or more states resulting from these actions, and which may be described as a Markov Decision Process (MDP). Thus, a particular environment may have an S set of states, an A set of actions, where a P(s'|s,a) transition model may describe a probability that an action a in the state s leads to state s' and an R(s,a) reward function. An agent may perform different actions with this environment based on the agent's policy π. With respect to the context of hydraulic stimulation operations, various actions performed by pump agents may result in changes to one or more states of a hydraulic stimulation environment. For example, a hydraulic stimulation environment (e.g., hydraulic stimulation environment X (965)) may be a real-world well environment, where multiple mechanical agents interacting with this real-world environment.

Based on a particular agent's action, for example, a hydraulic stimulation environment may undergo various physical effects that are externalized in changes to pressure values (e.g., pressure values (963)), acoustic sensing values (e.g., acoustic sensing values (962) that may be acquired from a DAS system), and/or flow rate values (e.g., flow rate values (961)). Likewise, the hydraulic stimulation environment may be an output of a particular geology (e.g., represented by geological values (964)). For example, a shale reservoir and a carbonate formation may have different hydraulic stimulation environments based on their geological differences. In some embodiments, a hydraulic stimulation environment is a simulated environment, where a pump agent may be implemented as one or more computers interacting with the simulated environment. For example, a hydraulic stimulation operation may be simulated as a video game, where pump agents may be simulated users playing the video game.

In some embodiments, a reinforcement learning system includes an action selector engine (e.g., action selector engine A (920)). In particular, an action selector engine include hardware and/or software with functionality for determining one or more actions based on one or more agent policies (e.g., agent policies (921)) and observation data (e.g., observation data A (980)) characterizing one or more current states of a hydraulic stimulation environment. Some examples of an action selector engine may include machine-learning models, such as an artificial neural network or a random forest, which determines actions based on various input features within the observation data. Depending on changes to the observation data, a pump agent may be instructed to implement a particular action, e.g., by a command or control signal. In another embodiment, the action selector engine determines actual commands for components in a well network (e.g., an action may correspond to command X (171) that is adjusting a pump operation of pump system A (121) in FIG. 1). In another embodiment, an action selector engine determines action scores that are used by pump agents for adjusting pump operations, where different actions scores correspond to different flow rate adjustments.

Turning to observation data, observation data may include pressure data, flow rate data, geological data (such as acquired from well log data or seismic data), and acoustic sensing data (e.g., from a DAS system). Observation data at a particular time step may include data from a previous time step that may be beneficial in characterizing the hydraulic stimulation environment. In some embodiments, a reinforcement learning system may include a replay buffer (e.g., replay buffer (990)) that stores observation data in association with different pump agent trajectories (e.g., pump agent X trajectory (991), pump agent Y trajectory (992), pump agent Z trajectory (993)). For example, a trajectory may specify a sequence of observations characterizing respective states of the environment. In some embodiments, a trajectory may correspond to a vector of different states of a hydraulic stimulation environment, different actions performed by various pump agents, and/or various reward values obtained in response to the different actions.

In some embodiments, a reinforcement learning system uses one or more pure reinforcement learning algorithms (e.g., without an experts' demonstration) to determine an agent policy for one or more agents. A pure reinforcement learning algorithm may start with a random policy that is continuously improved through trial-and-error based on various rewards received using a reward function. For example, a policy may be trained using a software simulator for the hydraulic fracturing environment. The resulting simulation-trained policy may provide a starting point in a real stimulation operation to further improve the policy.

In some embodiments, a reinforcement learning system includes a training system (e.g., training system (935)). The training system may be coupled to an action selector engine and include hardware and/or software with functionality for updating one or more policy parameters in a respective agent policy (e.g., policy parameters (922)) and/or one or more reward parameters (e.g., reward parameters (924)) in a respective reward function. In particular, a training system may use training data (e.g., training data (945)) to iteratively update agent policies and/or reward functions using one or more machine-learning algorithms (e.g., machine-learning algorithm C (933)). Here, training data may include an expert's demonstrations or trajectories that may be obtained by enabling a human to control a pump agent's actions, and logging the resulting expert observations of a hydraulic stimulation environment. Expert demonstrations may also correspond to historical data (e.g., historical observation data A (946)), augmented data (e.g., augmented observation data A (947)), and/or synthetic data (e.g., synthetic observation data C (948)) that provides an optimized action with respect to a particular state of a hydraulic stimulation environment. Thus, a training system may use a loss function (e.g., loss function D (934)) to determine a difference between an expert's demonstration and selected actions based on one or more agent policies. The training system may use this difference to update parameters within a reinforcement learning system through one or more imitation learning processes.

With respect to imitation learning processes, a reinforcement learning system may use imitation learning processes to learn an optimal agent policy or optimal reward function from an expert's demonstration or a supervising signal. Such techniques may be distinguished from pure reinforcement learning algorithms that learn from sparse rewards or through manually specifying a reward function. In other words, a reinforcement learning system may have an easier avenue to learn an optimal agent policy or actual reward function by having a teacher demonstrate a desired behavior rather than manually engineering such behavior. Accordingly, an expert's demonstrations may form a trajectory $\tau=(s_0, a_0, s_1, a_1, \ldots)$, where the expert's actions are determined by an expert's policy, that may correspond to an optimal policy. In some embodiments, an expert may be queried during a training process, to obtain training data for a particular hydraulic stimulation environment.

In one embodiment, an imitation learning process is a behavioral cloning process. For example, a reinforcement learning system may use behavior cloning to directly map from one or more states to one or more actions, thereby forming a state-action pair. Based on an expert's demonstrations, these state-action pairs may be determined using supervised learning and a loss function. A hydraulic stimulation environment with an identifiable set of states may be well suited for a behavioral cloning process.

In another embodiment, an imitation learning process is a direct policy learning (DPL) process or direct policy searching process that uses training data to determine an agent policy that maximizes an expected reward and/or reduces an expected loss. In particular, a DPL process may iteratively access an interactive expert during a training process. With sufficient training data, a pump agent may remember past mistakes and train the agent policy in order to converge at an optimum policy. For example, a DPL process may implement a data aggregation algorithm or policy aggregation algorithm. In a data aggregation algorithm, the data aggregation algorithm may train the agent policy using an entire training dataset. In a policy aggregation algorithm, the policy aggregation algorithm trains an agent policy on the training data obtained in the previous iteration and subsequently combines the current policy with previous policies using geometric blending.

In another embodiment, an imitation learning process is an inverse reinforcement learning (IRL) process. For example, an IRL process may determine a reward function of the hydraulic stimulation environment based on an expert's demonstrations. After determining the actual reward function, the IRL process may determine the optimal policy that maximizes the identified reward function using reinforcement learning. In particular, the reward function may be parameterized (e.g., reward parameters (924)) and the reward parameters may be iteratively updated. After identifying both the reward function and an optimal policy, the optimal policy may be compared to an identified expert's policy.

Keeping with IRL processes, an IRL process method may be a model-based algorithm or a model-free algorithm. In a model-based algorithm, the reinforcement learning system may determine a linear reward function or a forward model of a hydraulic stimulation environment that is used to learn an agent's policy. In a model-free algorithm, the reward function may be complex and thus a machine-learning model (e.g., a neural network) may be used to approximate the complex reward function.

While FIG. 9 shows various configurations of components, other configurations may be used without departing from the scope of the disclosure. For example, various components in FIG. 9 may be combined to create a single component. As another example, the functionality performed by a single component may be performed by two or more components.

Figure 10:
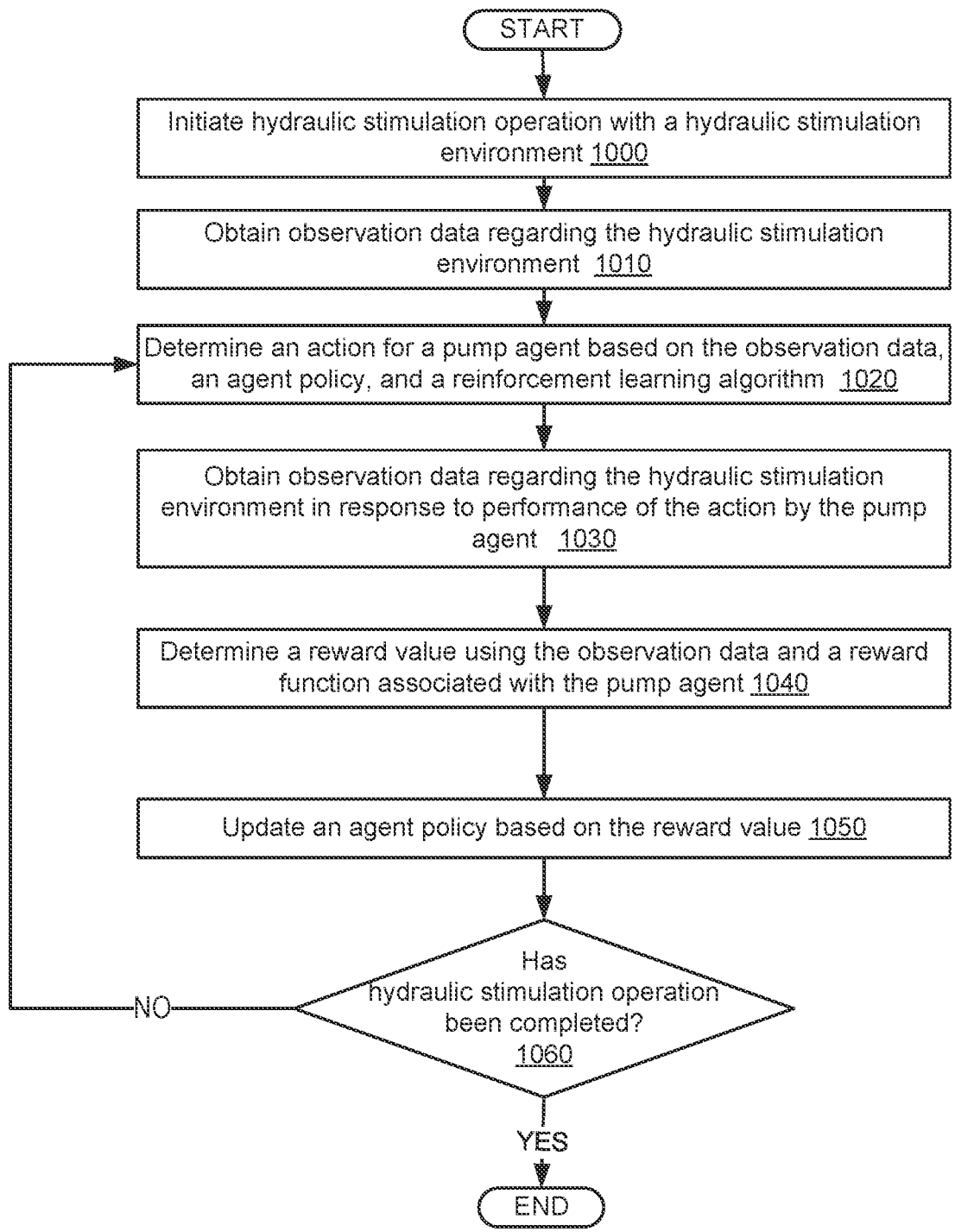
FIG. 10 shows a flowchart in accordance with one or more embodiments.

Turning to FIG. 10, FIG. 10 shows a flowchart in accordance with one or more embodiments. Specifically, FIG. 10 describes a specific method that determines flow rate rules using a reinforcement learning algorithm. One or more blocks in FIG. 10 may be performed by one or more components (e.g., hydraulic stimulation manager X (180) or a reinforcement learning system (110)) as described in FIGS. 1, 2, 3, and 9. While the various blocks in FIG. 10 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 1000, a hydraulic stimulation operation with a hydraulic stimulation environment is initiated in accordance with one or more embodiments.

In Block 1010, observation data are obtained regarding the hydraulic stimulation environment in accordance with one or more embodiments.

In Block 1020, an action for a pump agent is determined based on observation data, an agent policy, and a reinforcement learning algorithm in accordance with one or more embodiments. For example, reinforcement learning may be used to control a flow rate during hydraulic stimulation operations.

In some embodiments, an agent policy may be trained using historical fracturing data where rule-based algorithms were previously used to control flow rates. One technique for training the agent policy may include using previous fracturing data to assign positive rewards upon attaining relatively lower pressure values, to assign positive rewards upon attaining smoother overall pressure behavior (e.g., avoiding sudden pressure spikes), to assign negative rewards upon attaining sudden increases in pressure, etc. Thus, the agent policy may be trained to recommend various flow rate adjustments to achieve gradual pressure ramp and desired pressure behavior. The agents may learn and improve through increasing numbers of hydraulic stimulation operations.

In Block 1030, observation data are obtained regarding the hydraulic stimulation environment in response to performance of an action by a pump agent in accordance with one or more embodiments.

In Block 1040, a reward value is determined using observation data and a reward function associated with a pump agent in accordance with one or more embodiments. In a reinforcement learning algorithm, a pump agent may perform an action in the hydraulic stimulation environment, and then receive either a positive or a negative reward. For example, the goal for a pump agent may be to maximize its cumulative (positive) reward in the long-term.

In Block 1050, an agent policy is updated based on a reward value in accordance with one or more embodiments. For example, a reinforcement learning system may adjust an agent's policy based on various rewards obtained by previous actions. In some embodiments, an agent policy is updated using a training system. In particular, one or more imitation learning techniques may be used to learn and/or adjust an agent policy or a reward function based on training data. For example, a mismatch between observation data and training data may be obtained using a loss function. Accordingly, policy parameters or reward parameters may be adjusted based on error data associated with the mismatch.

In Block 1060, a determination is made whether a hydraulic stimulation operation is complete in accordance with one or more embodiments. Where the hydraulic stimulation operation is complete, this process may end. Where the hydraulic stimulation operation is unfinished, the process may proceed to Block 1020 to determine another action by a pump agent according to an updated agent policy.

Figure 11:
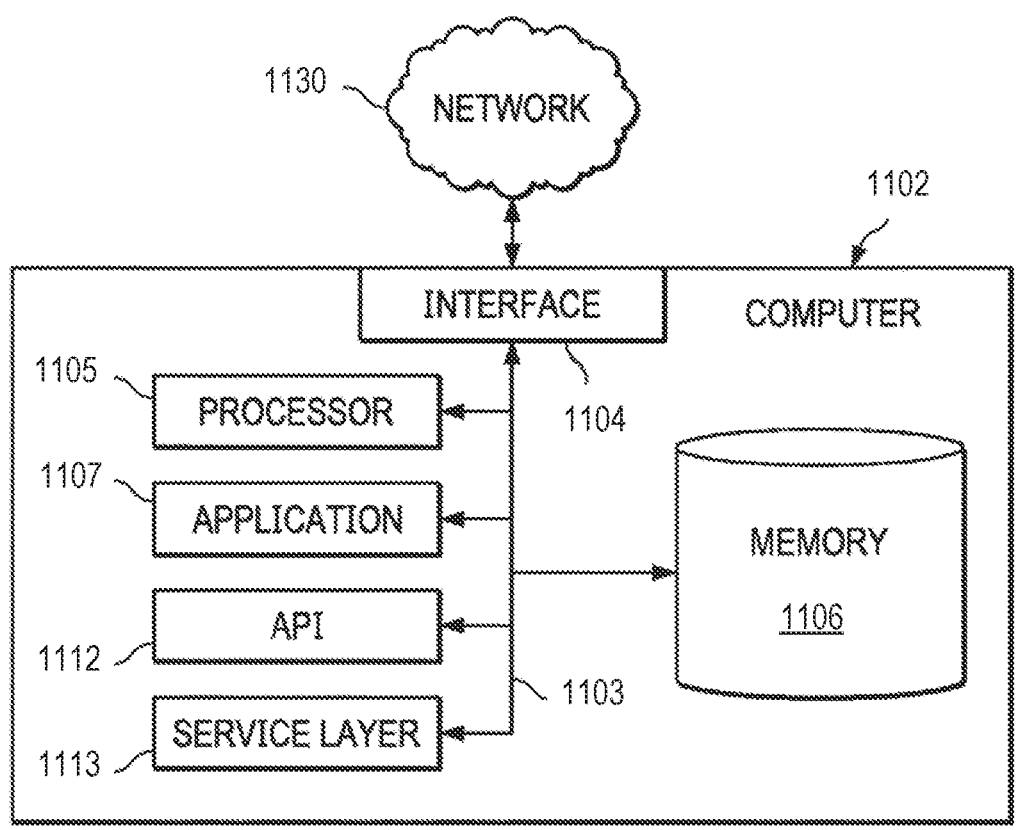
FIG. 11 shows a computer system in accordance with one or more embodiments.

Embodiments may be implemented on a computer system. FIG. 11 is a block diagram of a computer system (1102) used to provide computational functionalities associated with described algorithms, methods, functions, processes, flows, and procedures as described in the instant disclosure, according to an implementation. The illustrated computer (1102) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1102) may include a computer that includes an input device, such as a keypad, keyboard, touch screen, or other device that can accept user information, and an output device that conveys information associated with the operation of the computer (1102), including digital data, visual, or audio information (or a combination of information), or a GUI.

The computer (1102) can serve in a role as a client, network component, a server, a database or other persistency, or any other component (or a combination of roles) of a computer system for performing the subject matter described in the instant disclosure. The illustrated computer (1102) is communicably coupled with a network (1130) or cloud. In some implementations, one or more components of the computer (1102) may be configured to operate within environments, including cloud-computing-based, local, global, or other environment (or a combination of environments).

At a high level, the computer (1102) is an electronic computing device operable to receive, transmit, process, store, or manage data and information associated with the described subject matter. According to some implementations, the computer (1102) may also include or be communicably coupled with an application server, e-mail server, web server, caching server, streaming data server, business intelligence (BI) server, or other server (or a combination of servers).

The computer (1102) can receive requests over network (1130) or cloud from a client application (for example, executing on another computer (1102)) and responding to the received requests by processing the said requests in an appropriate software application. In addition, requests may also be sent to the computer (1102) from internal users (for example, from a command console or by other appropriate access method), external or third-parties, other automated applications, as well as any other appropriate entities, individuals, systems, or computers.

Each of the components of the computer (1102) can communicate using a system bus (1103). In some implementations, any or all of the components of the computer (1102), both hardware or software (or a combination of hardware and software), may interface with each other or the interface (1104) (or a combination of both) over the system bus (1103) using an application programming interface (API) (1112) or a service layer (1113) (or a combination of the API (1112) and service layer (1113). The API (1112) may include specifications for routines, data structures, and object classes. The API (1112) may be either computer-language independent or dependent and refer to a complete interface, a single function, or even a set of APIs. The service layer (1113) provides software services to the computer (1102) or other components (whether or not illustrated) that are communicably coupled to the computer (1102). The functionality of the computer (1102) may be accessible for all service consumers using this service layer. Software services, such as those provided by the service layer (1113), provide reusable, defined business functionalities through a defined interface. For example, the interface may be software written in JAVA, C++, or other suitable language providing data in extensible markup language (XML) format or other suitable format. While illustrated as an integrated component of the computer (1102), alternative implementations may illustrate the API (1112) or the service layer (1113) as stand-alone components in relation to other components of the computer (1102) or other components (whether or not illustrated) that are communicably coupled to the computer (1102). Moreover, any or all parts of the API (1112) or the service layer (1113) may be implemented as child or sub-modules of another software module, enterprise application, or hardware module without departing from the scope of this disclosure.

The computer (1102) includes an interface (1104). Although illustrated as a single interface (1104) in FIG. 11, two or more interfaces (1104) may be used according to particular needs, desires, or particular implementations of the computer (1102). The interface (1104) is used by the computer (1102) for communicating with other systems in a distributed environment that are connected to the network (1130). Generally, the interface (1104 includes logic encoded in software or hardware (or a combination of software and hardware) and operable to communicate with the network (1130) or cloud. More specifically, the interface (1104) may include software supporting one or more communication protocols associated with communications such that the network (1130) or interface's hardware is operable to communicate physical signals within and outside of the illustrated computer (1102).

The computer (1102) includes at least one computer processor (1105). Although illustrated as a single computer processor (1105) in FIG. 11, two or more processors may be used according to particular needs, desires, or particular implementations of the computer (1102). Generally, the computer processor (1105) executes instructions and manipulates data to perform the operations of the computer (1102) and any algorithms, methods, functions, processes, flows, and procedures as described in the instant disclosure.

The computer (1102) also includes a memory (1106) that holds data for the computer (1102) or other components (or a combination of both) that can be connected to the network (1130). For example, memory (1106) can be a database storing data consistent with this disclosure. Although illustrated as a single memory (1106) in FIG. 11, two or more memories may be used according to particular needs, desires, or particular implementations of the computer (1102) and the described functionality. While memory (1106) is illustrated as an integral component of the computer (1102), in alternative implementations, memory (1106) can be external to the computer (1102).

The application (1107) is an algorithmic software engine providing functionality according to particular needs, desires, or particular implementations of the computer (1102), particularly with respect to functionality described in this disclosure. For example, application (1107) can serve as one or more components, modules, applications, etc. Further, although illustrated as a single application (1107), the application (1107) may be implemented as multiple applications (1107) on the computer (1102). In addition, although illustrated as integral to the computer (1102), in alternative implementations, the application (1107) can be external to the computer (1102).

There may be any number of computers (1102) associated with, or external to, a computer system containing computer (1102), each computer (1102) communicating over network (1130). Further, the term "client," "user," and other appropriate terminology may be used interchangeably as appropriate without departing from the scope of this disclosure. Moreover, this disclosure contemplates that many users may use one computer (1102), or that one user may use multiple computers (1102).

In some embodiments, the computer (1102) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
   determining, by a computer processor and using a plurality of downhole sensors, time-derivative pressure data based on pressure data regarding a pump system that is performing a hydraulic stimulation operation using a hydraulic fracturing fluid in a geological region,
      wherein the plurality of downhole sensors comprises a first downhole sensor coupled to a casing within a wellbore and a second downhole sensor coupled to a frac plug within the wellbore, and
      wherein the hydraulic fracturing fluid is sent into a horizontal well in the wellbore at a predetermined flow rate during the hydraulic stimulation operation;
   determining, by the computer processor, a moving average value based on the time-derivative pressure data and a predetermined time window;
   determining, by the computer processor, a flow rate adjustment for the pump system based on the moving average value, an update interval for adjusting flow rates, and one or more predetermined flow rate rules, wherein a size of the predetermined time window is different from the update interval; and
   transmitting, automatically by the computer processor and based on the flow rate adjustment, a command to the pump system that changes the predetermined flow rate of the hydraulic fracturing fluid within the hydraulic stimulation operation.

2. The method of claim 1,
   wherein the plurality of downhole sensors stream the pressure data in real-time over a well network to a hydraulic stimulation manager disposed at a surface of a well site.

3. The method of claim 1,
   wherein the one or more predetermined flow rate rules are determined by a reinforcement learning system comprising an action selector engine and a training system, wherein the one or more predetermined flow rate rules correspond to one or more agent policies that are determined by a reinforcement learning algorithm, and wherein the one or more predetermined flow rate rules define a size of the dynamic time window, a size of the flow rate adjustment increment, and a plurality of conditions for increasing, decreasing, and maintaining a flow rate of the pump system.

4. The method of claim 1, wherein the one or more predetermined flow rate rules comprises a first rule, a second rule, and a third rule, wherein the first rule corresponds to no flow rate adjustment when the moving average value of time-derivative pressure data is positive, wherein the second rule correspond to a positive flow rate increment when the moving average of time-derivative pressure data value is negative or equal to zero, and wherein the third rule corresponds to a negative flow rate increment when a pressure value at a current time step is equal to or greater than the predetermined maximum pressure value.

5. The method of claim 1, further comprising:

obtaining flow rate data regarding the pump system from a flow rate sensor, wherein the one or more flow rate rules are based on the flow rate data from a previous time step.

6. The method of claim 1, further comprising:

determining a plurality of recommended flow rate adjustments for the pump system based on the moving average value and the one or more predetermined flow rate rules;

presenting, within a graphical user interface in a user device, the plurality of recommended flow rate adjustments; and transmitting, in response to a selection of a recommended flow rate adjustment among the plurality of recommended flow rate adjustments, a command to the pump system to implement the recommended flow rate adjustment.

7. The method of claim 1, further comprising:

determining a pressure curve from the pressure data; and performing a smoothing operation on the pressure curve using a Discrete Fourier Transform with a low-pass filter, or using a median filter to produce a smoothed pressure curve, and wherein the time-derivative pressure data are determined using the smoothed pressure curve.

8. The method of claim 1, wherein the hydraulic fracturing fluid comprises at least one propping agent, and wherein the hydraulic fracturing fluid produces a fracture network laterally from the wellbore.

9. The method of claim 1, wherein the hydraulic stimulation operation is a plug-and-perf operation, wherein the plug-and-perf operation sets the frac plug at a predetermined depth, and perforates a zone with a plurality of perforation clusters within the wellbore, and wherein the hydraulic fracturing fluid flows passed the plurality of perforation clusters.

10. The method of claim 1, wherein the pump system comprises a displacement pump that injects the hydraulic fracturing fluid into the wellbore based on the predetermined flow rate.

11. The method of claim 1, wherein the hydraulic stimulation operation produces at least one induced fracture that remains open following a stimulation treatment.

12. A system, comprising:

a pump system comprising a displacement pump that sends hydraulic fracturing fluid for a hydraulic stimulation operation, wherein the pump system is coupled to a wellbore comprising a horizontal well, and wherein the hydraulic fracturing fluid is sent into the horizontal well at a predetermined flow rate during the hydraulic stimulation operation;

a plurality of downhole sensors coupled to the pump system, wherein the plurality of downhole sensors determine pressure data regarding the hydraulic stimulation operation, and wherein the plurality of downhole sensors comprises a first downhole sensor coupled to a casing with a wellbore and a second downhole sensor coupled to a frac plug within the wellbore; and a hydraulic stimulation manager comprising a computer processor, wherein the hydraulic stimulation manager is coupled to the pump system, the hydraulic stimulation manager comprising functionality for:

determining time-derivative pressure data based on the pressure data;

determining a moving average value based on the time-derivative pressure data and a predetermined time window;

determining a flow rate adjustment for the pump system based on the moving average value, an update interval for adjusting flow rates, and one or more predetermined flow rate rules, wherein a size of the predetermined time window is different from the update interval; and transmitting, automatically based on the flow rate adjustment, a command to the pump system that changes the predetermined flow rate of the hydraulic fracturing fluid within the hydraulic stimulation operation.

13. The system of claim 12, wherein the one or more predetermined flow rate rules are determined by a reinforcement learning system comprising an action selector engine and a training system, wherein the one or more predetermined flow rate rules correspond to one or more agent policies that are determined by a reinforcement learning algorithm, and wherein the one or more predetermined flow rate rules define a size of the dynamic time window, a size of the flow rate adjustment increment, and a plurality of conditions for increasing, decreasing, and maintaining a flow rate of the pump system.

14. The system of claim 12, wherein the one or more predetermined flow rate rules comprises a first rule, a second rule, and a third rule, wherein the first rule corresponds to no flow rate adjustment when the moving average value of time-derivative pressure data is positive, wherein the second rule correspond to a positive flow rate increment when the moving average value of time-derivative pressure data is negative or equal to zero, and wherein the third rule corresponds to a negative flow rate increment when a pressure value at a current time step is equal to or greater than the predetermined maximum pressure value.

15. The system of claim 12, wherein the hydraulic stimulation manager further comprises functionality for:
- determining a plurality of recommended flow rate adjustments for the pump system based on the moving average value and the one or more predetermined flow rate rules;
- presenting, within a graphical user interface in a user device, the plurality of recommended flow rate adjustments; and
- transmitting, in response to a selection of a recommended flow rate adjustment among the plurality of recommended flow rate adjustments, a command to the pump system to implement the recommended flow rate adjustment.

16. The system of claim 12, wherein the hydraulic stimulation manager further comprises functionality for:
- obtaining first observation data regarding a hydraulic stimulation environment;
- determining, based on an agent policy and the first observation data, a first action for a pump agent, wherein the pump agent corresponds to the pump system, and wherein the first action corresponds to the flow rate adjustment for the pump system;
- obtaining second observation data regarding the hydraulic stimulation environment in response to the pump agent performing the first action;
- determining a reward value for the pump agent based on the second observation data and a reward function; and
- updating the agent policy based on the reward value to produce an updated policy,
- wherein the updated policy determines one or more actions for the pump agent.

17. The system of claim 12, further comprising:
- a training system that obtains training data regarding a plurality of pump agents,
- wherein the pump agent is trained based on a loss function and a mismatch between the training data and observation data regarding one or more hydraulic stimulation operations, and
- wherein a plurality of policy parameters of the updated policy are adjusted based on the mismatch.

18. The system of claim 17, further comprising:
- a replay buffer that obtains a plurality of pump agent trajectories regarding a plurality of pump agents,
- wherein the training system updates a reward function based on the plurality of pump agent trajectories.

* * * * *